United States Patent
Lawson et al.

(10) Patent No.: US 9,056,316 B2
(45) Date of Patent: Jun. 16, 2015

(54) SEMI-INTERPENETRATING POLYMER NETWORK

(75) Inventors: Del R. Lawson, Cottage Grove, MN (US); James I. Hembre, Plymouth, MN (US); Jerald K. Rasmussen, Woodville, WI (US); Catherine A. Bothof, Stillwater, MN (US); Kannan Seshadri, Woodbury, MN (US); Robert T. Fitzsimons, Jr., Minneapolis, MN (US); Andrew W. Rabins, St. Paul, MN (US); Taib K. Ansera, St. Paul, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 63 days.

(21) Appl. No.: 13/703,267

(22) PCT Filed: Jun. 17, 2011

(86) PCT No.: PCT/US2011/040823
§ 371 (c)(1),
(2), (4) Date: Dec. 10, 2012

(87) PCT Pub. No.: WO2011/163070
PCT Pub. Date: Dec. 29, 2011

(65) Prior Publication Data
US 2013/0090397 A1    Apr. 11, 2013

Related U.S. Application Data

(60) Provisional application No. 61/358,691, filed on Jun. 25, 2010.

(51) Int. Cl.
| | | |
|---|---|---|
| B01J 41/14 | (2006.01) | |
| B01J 39/20 | (2006.01) | |
| C08J 3/24 | (2006.01) | |
| C08L 33/26 | (2006.01) | |
| C08L 101/00 | (2006.01) | |

(52) U.S. Cl.
CPC B01J 41/14 (2013.01); B01J 39/20 (2013.01); C08J 3/246 (2013.01); C08J 2333/26 (2013.01); C08J 2400/00 (2013.01); C08L 33/26 (2013.01); C08L 101/00 (2013.01); C08L 2205/04 (2013.01); C08L 2205/16 (2013.01); C08L 2205/22 (2013.01); C08L 2312/00 (2013.01)

(58) Field of Classification Search
CPC ............. C08J 5/24; C08J 5/2275; C08J 9/286
USPC ........................................................ 525/903
See application file for complete search history.

(56) References Cited

U.S. PATENT DOCUMENTS

| | | |
|---|---|---|
| 3,058,594 A | 10/1962 | Hultgren |
| 4,153,661 A | 5/1979 | Ree |
| 4,157,418 A | 6/1979 | Heilmann |
| 4,565,663 A | 1/1986 | Errede |
| 4,708,981 A * | 11/1987 | Zupancic et al. ............... 525/59 |
| 4,810,381 A | 3/1989 | Hagen |
| 4,829,127 A | 5/1989 | Muramoto |
| 4,842,739 A | 6/1989 | Tang |
| 4,957,943 A | 9/1990 | McAllister |
| 4,971,736 A | 11/1990 | Hagen |
| 5,279,742 A | 1/1994 | Markell |
| 5,376,727 A * | 12/1994 | Iqbal et al. ..................... 525/196 |
| 5,468,847 A | 11/1995 | Heilmann |
| 5,532,311 A | 7/1996 | Sirvio |
| 5,580,929 A * | 12/1996 | Tanaka et al. ................. 525/218 |
| 5,837,752 A * | 11/1998 | Shastri et al. ................. 523/116 |
| 5,925,379 A | 7/1999 | Mandeville, III |
| 5,993,935 A | 11/1999 | Rasmussen |
| RE36,811 E | 8/2000 | Markell |
| 6,319,404 B1 | 11/2001 | Zhang |
| 7,098,253 B2 | 8/2006 | Rasmussen |
| 7,582,684 B2 | 9/2009 | Rasmussen |
| 7,674,835 B2 | 3/2010 | Rasmussen |
| 7,674,836 B2 | 3/2010 | Rasmussen |
| 7,683,100 B2 | 3/2010 | Rasmussen |
| 8,338,496 B2 | 12/2012 | Rasmussen |
| 8,338,497 B2 | 12/2012 | Rasmussen |
| 8,349,906 B2 | 1/2013 | Rasmussen |
| 2004/0001892 A1 | 1/2004 | Healy |
| 2007/0197754 A1* | 8/2007 | White et al. ................... 527/300 |

(Continued)

FOREIGN PATENT DOCUMENTS

| | | |
|---|---|---|
| CN | 101195664 | 6/2008 |
| JP | 2007-049966 | 3/2007 |
| WO | WO 2004/004679 | 1/2004 |
| WO | WO 2005/061611 | 7/2005 |
| WO | WO 2008/130604 | 10/2008 |
| WO | WO 2009/099210 | 8/2009 |
| WO | WO 2009099210 A1 * | 8/2009 |
| WO | WO 2010/058108 | 5/2010 |

OTHER PUBLICATIONS

Shahidi, N.; Teymour, F.; Arastoopour, H. "Amphiphilic particulate phase semi-interpenetrating polymer networks based on recycled rubber matrix" Polymer 45 (2004) pp. 5183-5190.*

(Continued)

Primary Examiner — Randy Gulakowski
Assistant Examiner — Christina Wales
(74) Attorney, Agent, or Firm — Jean A. Lown

(57) ABSTRACT

Semi-interpenetrating polymeric networks are described. More specifically, the semi-interpenetrating polymeric networks include at least two polymers that are closely associated. The first polymer is an ionic polymer that is not crosslinked. The second polymer is a cross-linked polymer that can be either another ionic polymer or a non-ionic polymer. Methods of making the semi-interpenetrating polymeric networks, articles containing the semi-interpenetrating polymeric networks, and methods of using the semi-interpenetrating polymeric networks are also described. The semi-interpenetrating polymeric networks can function as ion exchange resins.

17 Claims, No Drawings

(56) References Cited

U.S. PATENT DOCUMENTS

| | | |
|---|---|---|
| 2008/0237133 A1* | 10/2008 | Dale et al. .................. 210/660 |
| 2009/0088846 A1* | 4/2009 | Myung et al. ............. 623/14.12 |
| 2009/0202825 A1 | 8/2009 | Marx |
| 2010/0075131 A1 | 3/2010 | Etzel |
| 2010/0075560 A1 | 3/2010 | Seshadri |
| 2010/0116739 A1* | 5/2010 | Rasmussen et al. .......... 210/638 |
| 2010/0170636 A1 | 7/2010 | Hanefeld |
| 2010/0311850 A1 | 12/2010 | Wickert |
| 2011/0100916 A1 | 5/2011 | Shannon |
| 2012/0058413 A1 | 3/2012 | Stevens |
| 2013/0068693 A1 | 3/2013 | Rabins |
| 2015/0010816 A1* | 1/2015 | Chung et al. .................. 429/217 |

OTHER PUBLICATIONS

International Search Report for PCT/US2011/040823, 4 pages.

Barrett, "The Determination of Pore Volume and Area Distributions in Porous Substances. I. Computations from Nitrogen Isotherms", Journal of the American Chemical Society, Jan. 1951, vol. 73, No. 1, pp. 373-380.

Decher, "Buildup of Ultrathin Multilayer Films by a Self-assembly Process: III. Consecutively Alternating Adsorption of Anionic and Cationic Polyelectrolytes on Charged Surfaces", Thin Solid Films, Apr. 30, 1992, vols. 210-211, Part 2, pp. 831-835.

Drtina, "Highly Cross-Linked Azlactone Functional Supports of Tailorable Polarity", Macromolecules, Jun. 17, 1996, vol. 29, No. 13, pp. 4486-4489.

MacIntyre, "Control of Porous Morphology in Suspension Polymerized Poly(divinylbenzene) Resins Using Oligomeric Porogens", Macromolecules, Oct. 5, 2004, vol. 37, No. 20, pp. 7628-7636.

Rasmussen, "Crosslinked, Hydrophilic, Azlactone-functional Polymeric Beads: A Two-step Approach", Reactive Polymers, Feb. 1992, vol. 16, No. 2, pp. 199-212.

Sherrington, "Preparation, Structure and Morphology of Polymer Supports", Chemical Communications, 1998, Issue 21, pp. 2275-2286.

Shiratori, "pH-Dependent Thickness Behavior of Sequentially Adsorbed Layers of Weak Polyelectrolytes", Macromolecules, May 30, 2000, vol. 33, No. 11, pp. 4213-4219.

Tashiro, "Removal of *Escherichia coli* from Water by Systems Based on Insoluble Polystyrene—Poly(ethylene Glycol)s,—Polyethylenimines, and —Polyethylenepolyamines Quaternized", Journal of Applied Polymer Science, Oct. 5, 1991, vol. 43, No. 7, pp. 1369-1377.

\* cited by examiner

SEMI-INTERPENETRATING POLYMER NETWORK

TECHNICAL FIELD

Semi-interpenetrating polymeric networks, articles containing the semi-interpenetrating polymeric network, methods of making the semi-interpenetrating polymeric network, and methods of using the semi-interpenetrating polymeric network are described.

BACKGROUND

Ion exchange resins have been prepared by copolymerization of various ionic monomers and crosslinking monomers as described, for example, in U.S. Pat. No. 7,683,100 (Rasmussen et al.), U.S. Pat. No. 7,674,835 (Rasmussen et al.), U.S. Pat. No. 7,674,836 (Rasmussen et al.), and U.S. Pat. No. 7,098,253 (Rasmussen et al.). Some ion exchange resins have been used for purification and/or separation of biomolecules such as proteins. To be useful in large scale purification and/or separation processes, ion exchange resins with relatively high binding capacity and sufficient rigidity to withstand pressure-flow requirements encountered in large diameter chromatographic columns are often desired. Preparing ion exchange resins with this combination of suitable rigidity and binding capacity has been a challenge in the industry.

SUMMARY

Semi-interpenetrating polymeric networks are described. More specifically, these semi-interpenetrating polymeric networks include at least two polymers that are closely associated. That is, a first polymer is entrapped at least partially within a second polymer through physical entanglements. The first polymer is an ionic polymer that is not crosslinked. The second polymer is a cross-linked polymer that can be either another ionic polymer or a non-ionic polymer. Methods of making the semi-interpenetrating polymeric networks, articles containing the semi-interpenetrating polymeric networks, and methods of using the semi-interpenetrating polymeric networks are also described. The semi-interpenetrating polymeric networks can function as ion exchange resins.

In a first aspect, a semi-interpenetrating polymeric network is described. The semi-interpenetrating polymeric network contains an ionic first polymer having a first ionic group and a crosslinked second polymer prepared by free radical polymerization of a second monomer composition in the presence of the ionic first polymer. The second monomer composition contains at least 30 weight percent of a crosslinking monomer based on a total weight of monomers in the second monomer composition.

In a second aspect, a method of preparing a semi-interpenetrating polymeric network is described. The method includes forming an aqueous phase composition that contains an ionic first polymer, a second monomer composition, and an aqueous-based solvent composition. The ionic first polymer is soluble in the aqueous phase composition and has a first ionic group. The second monomer composition is soluble in the aqueous phase composition and contains at least 30 weight percent of a crosslinking monomer based on a total weight of monomers in the second monomer composition. The aqueous-based solvent composition contains water. The method further includes suspending the aqueous phase composition in an organic phase that includes a non-polar organic solvent and polymerizing the second monomer composition to form particles of a semi-interpenetrating polymer network.

In a third aspect, a method of separating, purifying, or immobilizing an ionic material is provided. The method includes providing a semi-interpenetrating polymeric network that includes an ionic first polymer having a first ionic group and a crosslinked second polymer prepared by free radical polymerization of a second monomer composition in the presence of the ionic first polymer. The second monomer composition contains at least 30 weight percent of a crosslinking monomer based on a total weight of monomers in the second monomer composition. The method further includes contacting the semi-interpenetrating polymeric network with an ionic material having a charge that is opposite that of the first ionic group. The method still further includes adsorbing at least a portion of the ionic material on the semi-interpenetrating polymeric network.

In a fourth aspect, an article is described. The article includes a porous support and a semi-interpenetrating polymeric network particle that is incorporated into the porous support, positioned on a surface of the porous support, or a combination thereof. The semi-interpenetrating polymeric network particle includes an ionic first polymer that has a first ionic group and a crosslinked second polymer prepared by free radical polymerization of a second monomer composition in the presence of the ionic first polymer. The second monomer composition contains at least 30 weight percent of a crosslinking monomer based on a total weight of monomers in the second monomer composition.

DETAILED DESCRIPTION

Semi-interpenetrating polymeric networks are provided that can function as ion exchange resins. These ion exchange resins can be used for the separation, purification, or immobilization of various ionic materials having an ionic charge opposite to that of the ion exchange resin. The ion exchange resins can be used, if desired, in large scale processes for the purification, separation, or immobilization of various target materials that are ionic under certain pH conditions. Stated differently, ion exchange resins can be prepared to provide high binding capacity and sufficient rigidity to withstand the pressures and flow requirements of large scale processes.

The term "a", "an", and "the" are used interchangeably with "at least one" to mean one or more of the elements being described.

The term "and/or" as used in the expression "A and/or B" means A alone, B alone, or the combination of A and B.

The recitation of any numerical range by endpoints is meant to include the endpoints of the range, all numbers within the range, and any narrower range within the stated range. The term "charged" and "ionic" refer to materials having at least one ionic group or a neutralized form of an ionic group as part of its chemical structure. A negatively charged material is an anionic material (i.e., anion) and, depending on the pH conditions, contains at least one anionic group or a neutralized form of the anionic group. Typical anionic groups or neutralized forms thereof include, for example, weak acidic groups, salts of weak acidic groups, strong acidic groups, salts of strong acidic groups, or mixtures thereof. A positively charged material is a cationic material (i.e., cation) and, depending on the pH conditions, contains at least one cationic group or a neutralized form of the cationic group. Typical cationic groups or neutralized forms thereof include, for example, weak basic groups, salts of weak basic groups, strong basic groups, salts of strong basic groups, or mixtures thereof.

As used herein, the term "polymer" or "polymeric" refers to a material that is a homopolymer, copolymer, terpolymer, or the like. Likewise, the term "polymerize" or "polymerization" refers to the process of making a homopolymer, copolymer, terpolymer, or the like. The terms "copolymer" or "copolymeric" can be used to refer to a polymer prepared using two or more different monomers.

As used herein, the term "semi-interpenetrating polymeric network" refers to a network of at least two polymeric materials (i.e., polymers) having different compositions. At least one of the polymers is crosslinked and at least one of the polymers is not crosslinked. The two polymeric materials are not simply blended together but are more closely associated with each other. For example, the crosslinked second polymer is often formed in the presence of the non-crosslinked polymer and at least partially entraps the non-crosslinked polymer through physical entanglements.

The terms "capacity", "binding capacity", and "ion exchange capacity" are used interchangeably. The capacity is often measured by determining the static ion exchange capacity or the dynamic ion exchange capacity as described in the Examples section.

More specifically, the semi-interpenetrating polymeric network contains an ionic first polymer and a crosslinked second polymer. The crosslinked second polymer is prepared by free radical polymerization of a second monomer composition in the presence of the ionic first polymer. The ionic first polymer is not crosslinked and can have (a) anionic groups and/or neutralized anionic groups or (b) cationic groups and/or neutralized cationic groups. The crosslinked second polymer can be ionic or non-ionic. If the crosslinked second polymer is ionic, it often contains second ionic groups with an opposite charge to the first ionic groups on the ionic first polymer. The crosslinked second polymer at least partially entraps the ionic first polymer.

Any suitable ionic polymer can be included in the semi-interpenetrating polymeric network as the ionic first polymer. The ionic first polymer has multiple first ionic groups that can be positively charged, negatively charged, or neutral depending on the pH. Due to the presence of the ionic first polymer, the resulting semi-interpenetrating network can function as an ion exchange resin. Suitable negatively charged ionic groups or neutralized forms thereof include, for example, a weak acidic group, a strong acidic group, a salt of a weak acidic group, a salt of a strong acidic group, or a combination thereof. Salts of acidic groups can have counter ions selected, for example, from alkali metal ions, alkaline earth metal ions, ammonium ions, or ammonium ions substituted with alkyl groups, aryl groups, aralkyl groups, or a combination thereof. Suitable positively charged groups or neutralized forms thereof include, for example, a weak basic group, a strong basic group, a salt of a weak basic group, a salt of a strong basic group, or a combination thereof. Salts of basic groups can have counter ions selected, for example, from a halide (e.g., chloride), a carboxylate (e.g., acetate or formate), nitrate, phosphate, sulfate, bisulfate, methyl sulfate, or hydroxide.

The ionic first polymer is often formed by polymerization of a first monomer composition that includes at least one ionic monomer. The ionic monomer typically includes an ionic group plus at least one ethylenically unsaturated group capable of undergoing free radical polymerization. In some embodiments, the ethylenically unsaturated group is a (meth)acryloyl group or a vinyl group.

Some negatively charged ionic monomers or neutralized forms thereof for preparing the ionic first polymer have strong acidic groups or salts thereof. For example, some suitable ionic monomers include, but are not limited to, (meth)acrylamidosulfonic acids of Formula (I) or salts thereof

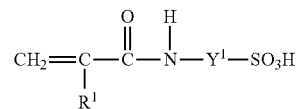

In Formula (I), $Y^1$ is a straight or branched alkylene (e.g., an alkylene having 1 to 10 carbon atoms, 1 to 6 carbon atoms, or 1 to 4 carbon atoms) and $R^1$ is hydrogen or methyl. Example ionic monomers according to Formula (I) include, but are not limited to, N-acrylamidomethanesulfonic acid, 2-acrylamidoethanesulfonic acid, 2-acrylamido-2-methylpropanesulfonic acid, and 2-methacrylamido-2-methylpropanesulfonic acid. Salts of these acidic monomers can also be used.

Other suitable negatively charged ionic monomers or neutralized forms thereof include sulfonic acids such as vinylsulfonic acid and 4-styrenesulfonic acid; phosphonic acids such as vinyl phosphonic acid; (meth)acrylamidophosphonic acids such as (meth)acrylamidoalkylphosphonic acids (e.g., 2-acrylamidoethylphosphonic acid and 3-methacrylamidopropylphosphonic acid); acrylic acid and methacrylic acid; and carboxyalkyl(meth)acrylates such as 2-carboxyethylacrylate, 2-carboxyethylmethacrylate, 3-carboxypropylacrylate, and 3-carboxypropylmethacrylate. Still other suitable ionic monomers with acidic groups include (meth)acryloylamino acids, such as those described in U.S. Pat. No. 4,157,418 (Heilmann). Example (meth)acryloylamino acids include, but are not limited to, N-acryloylglycine, N-acryloylaspartic acid, N-acryloyl-β-alanine, and 2-acrylamidoglycolic acid. Salts of any of these ionic monomers with acidic groups can also be used.

In some embodiments the ionic first polymer is an anionic polymer such as, for example, poly(2-acrylamido-2-methylpropanesulfonic acid) or salts thereof such as sodium salts thereof.

Some positively charged ionic monomers or neutralized forms thereof for preparing the ionic first polymer have strong basic groups or salts thereof. For example, some suitable ionic monomers include, but are not limited to, amino(meth)acrylates or amino(meth)acrylamides of Formula (II) or quaternary ammonium salts thereof

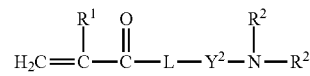

In Formula (II), $R^1$ is hydrogen or methyl; L is oxy or —NH—; and $Y^2$ is an alkylene (e.g., an alkylene having 1 to 10 carbon atoms, 1 to 6 carbon atoms, or 1 to 4 carbon atoms). Each $R^2$ is independently hydrogen, alkyl, hydroxyalkyl (i.e., an alkyl substituted with a hydroxy), or aminoalkyl (i.e., an alkyl substituted with an amino). Alternatively, the two $R^2$ groups taken together with the nitrogen atom to which they are attached can form a heterocyclic group that is aromatic, partially unsaturated (i.e., unsaturated but not aromatic), or saturated, wherein the heterocyclic group optionally can be fused to a second ring that is aromatic (e.g., benzene), partially unsaturated (e.g., cyclohexene), or saturated (e.g., cyclohexane). The counter ions of the quaternary ammonium salts are often halides, sulfates, phosphates, nitrates, and the like.

In some embodiments of Formula (II), both $R^2$ groups are hydrogen. In other embodiments, at least one of the $R^2$ groups is an alkyl having 1 to 10 carbon atoms, 1 to 6 carbon atoms, or 1 to 4 carbon atoms. In still other embodiments, at least one of $R^2$ groups is a hydroxy alkyl or an amino alkyl that has 1 to 10 carbon atoms, 1 to 6 carbon atoms, or 1 to 4 carbon atoms with the hydroxy or amino group being positioned on any of the carbon atoms of the alkyl group. In yet other embodiments, the $R^2$ groups combine with the nitrogen atom to which they are attached to form a heterocyclic group. The heterocyclic group includes at least one nitrogen atom and can contain other heteroatoms such as oxygen or sulfur. Example heterocyclic groups include, but are not limited to imidazolyl. The heterocyclic group can be fused to an additional ring such as a benzene, cyclohexene, or cyclohexane. Example heterocyclic groups fused to an additional ring include, but are not limited to, benzoimidazolyl.

Example amino(meth)acrylates (i.e., L in Formula (II) is oxy) include N,N-dialkylaminoalkyl(meth)acrylates such as, for example, N,N-dimethylaminoethylmethacrylate, N,N-dimethylaminoethylacrylate, N,N-diethylaminoethylmethacrylate, N,N-diethylaminoethylacrylate, N,N-dimethylaminopropylmethacrylate, N,N-dimethylaminopropylacrylate, N-tert-butylaminopropylmethacrylate, N-tert-butylaminopropylacrylate, and the like.

Example amino(meth)acrylamides (i.e., L in Formula (II) is —NH—) include, for example, N-(3-aminopropyl)methacrylamide, N-(3-aminopropyl)acrylamide, N-[3-(dimethylamino)propyl]methacrylamide, N-(3-imidazolylpropyl)methacrylamide, N-(3-imidazolylpropyl)acrylamide, N-(2-imidazolylethyl)methacrylamide, N-(1,1-dimethyl-3-imidazoylpropyl)methacrylamide, N-(1,1-dimethyl-3-imidazoylpropyl)acrylamide, N-(3-benzoimidazolylpropyl)acrylamide, and N-(3-benzoimidazolylpropyl)methacrylamide.

Example quaternary salts of the ionic monomers of Formula (II) include, but are not limited to, (meth)acrylamidoalkyltrimethylammonium salts (e.g., 3-methacrylamidopropyltrimethylammonium chloride and 3-acrylamidopropyltrimethylammonium chloride) and (meth)acryloxyalkyltrimethylammonium salts (e.g., 2-acryloxyethyltrimethylammonium chloride, 2-methacryloxyethyltrimethylammonium chloride, 3-methacryloxy-2-hydroxypropyltrimethylammonium chloride, 3-acryloxy-2-hydroxypropyltrimethylammonium chloride, and 2-acryloxyethyltrimethylammonium methyl sulfate).

Other monomers that can provide positively charged groups to an ion exchange resin include the dialkylaminoalkylamine adducts of alkenylazlactones (e.g., 2-(diethylamino)ethylamine, (2-aminoethyl)trimethylammonium chloride, and 3-(dimethylamino)propylamine adducts of vinyldimethylazlactone) and diallylamine monomers (e.g., diallylammonium chloride and diallyldimethylammonium chloride).

In some embodiments the ionic first polymer is a cationic polymer such as, for example, poly(methacrylamidopropyltrimethylammonium chloride), poly(acrylamidopropyltrimethylammonium chloride), and poly(diallyldimethylammonium chloride).

The amount of the first ionic monomer in the first monomer composition is typically selected so that the resulting ionic first polymer has a sufficient number of ionic groups to function as an ion exchange resin when included in the semi-interpenetrating polymeric network. In many embodiments, the first monomer composition contains at least 50 weight percent of the first ionic monomer based on a total weight of monomers in the first monomer composition. For example, the first monomer composition often contains at least 60 weight percent, at least 70 weight percent, at least 80 weight percent, at least 90 weight percent, at least 95 weight percent, at least 98 weight percent, or at least 99 weight percent of the first ionic monomer based on the total weight of monomers in the first monomer composition. In many embodiments, all of the monomers in the first monomer composition are ionic monomers. Although the first monomer composition can include more than one ionic monomer, all of the ionic monomers are usually selected to have the same charge and/or a neutralized form thereof. That is, all of the ionic groups are (a) positively charged and/or a neutralized form thereof or (b) negatively charged and/or a neutralized form thereof.

In addition to the ionic monomer, the first monomer composition can include at least some non-ionic monomer. For example, the first monomer composition can include up to 1 weight percent, up to 2 weight percent, up to 5 weight percent, up to 10 weight percent, up to 20 weight percent, up to 30 weight percent, up to 40 weight percent, or up to 50 weight percent of a non-ionic monomer. That is, the first monomer composition can contain 0 to 50 weight percent of a non-ionic monomer. To maximize the ion exchange capacity (i.e., binding capacity) of the ionic first polymer, the amount of the non-ionic monomer is often selected to be less or significantly less than the amount of the ionic monomer in the first monomer composition. For example, the first monomer composition can contain 0 to 40 weight percent, 0 to 20 weight percent, 0 to 10 weight percent, or 0 to 5 weight percent non-ionic monomer based on the total weight of monomers in the first monomer composition.

To ensure that the ionic first polymer is soluble in (i.e., dissolved in) the aqueous phase composition used to prepare the semi-interpenetrating polymeric network, all monomers included in the first monomer composition used to form the ionic first polymers are typically selected to have a lipophilicity index no greater than 20. As used herein, the term "lipophilicity index" or "LI" refers to an index for characterizing the hydrophobic or hydrophilic character of a monomer. The lipophilicity index is determined by partitioning a monomer in equal volumes (1:1) of a non-polar solvent (e.g., hexane) and a polar solvent (e.g., a 75:25 acetonitrile-water solution). The lipophilicity index is equal to the weight percent of the monomer remaining in the non-polar phase after partitioning. Monomers that are more hydrophobic tend to have a higher lipophilicity index; similarly, monomers that are more hydrophilic tend to have a lower lipophilicity index. Measurement of lipophilicity index is further described in Drtina et al., *Macromolecules*, 29, 4486-4489 (1996).

Examples of non-ionic monomers that have a sufficiently low lipophilicity index include, but are not limited to, hydroxyalkyl(meth)acrylates such as 2-hydroxyethylacrylate, 3-hydroxypropylacrylate, 2-hydroxyethylmethacrylate (e.g., LI is 1), and 3-hydroxypropylmethacrylate (e.g., LI is 2); acrylamide (e.g., LI is less than 1) and methacrylamide (LI is less than 1); glycerol monomethacrylate and glycerol monoacrylate; N-alkyl(meth)acrylamides such as N-methylacrylamide (e.g., LI is less than 1), N,N-dimethylacrylamide (e.g., LI is less than 1), N-methylmethacrylamide, and N,N-dimethylmethacrylamide; N-vinylamides such as N-vinylformamide, N-vinylacetamide, and N-vinylpyrrolidone; acetoxyalky(meth)acrylates such as 2-acetoxyethylacrylate and 2-acetoxyethylmethacrylate (e.g., LI is 9); glycidyl (meth)acrylates such as glycidylacrylate and glycidylmethacrylate (e.g., LI is 11); and vinylalkylazlactones such as vinyldimethylazlactone (e.g., LI is 15).

Any suitable method can be used to form the ionic first polymer. This polymer can be formed, for example, using a free radical polymerization process in an aqueous-based medium. In some example methods, the aqueous-based solvent composition includes water or a combination of water and a mono-alcohol having no greater than 4 carbon atoms. The reaction mixture is often purged with nitrogen and then heated in a sealed container at about 60° C. for at least 2 hours, at least 4 hours, at least 8 hours, or at least 24 hours. Suitable methods of preparing the ionic first polymers are further described in the Example section below.

Some suitable anionic polymers that are commercially available include, for example, poly(acrylic acid), poly(methacrylic acid), poly(styrenesulfonic acid), sodium salt of poly(vinylphosphonic acid), sodium salt of poly(styrenesulfonic acid/maleic acid), sodium salt of poly(acrylamide/acrylic acid). Some suitable cationic polymers that are commercially available include, for example, chitosan, hydrochloride of poly(allyl amine), poly(4-aminostyrene), poly(diallyldimethylammonium chloride), poly(2-dimethylaminoethyl methacrylate), poly(1-lysine hydrobromide), poly(2-methacryloxyethyltrimethylammonium bromide), poly(N-methylvinylamine), hydrochloride of poly(vinylamine), poly(4-vinyl-1-methylpyridinium bromide), and poly(2-vinylpyridine). These polymers can be obtained from various sources such as Polysciences, Inc. (Warrington, Pa.).

Although any suitable molecular weight of the ionic first polymer can be used as the ionic first polymer in the semi-interpenetrating polymeric network, the weight average molecular weight of the ionic first polymer is often at least 50,000 gram/mole. For example, the weight average molecular weight is often at least 75,000 grams/mole, at least 100,000 gram/mole, at least 150,000 grams/mole, or at least 200,000 grams/mole. The weight average molecular weight is typically selected so that the ionic first polymer is soluble in aqueous phase composition used to form the semi-interpenetrating network. More specifically, the weight average molecular weight is often no greater than 2,000,000 grams/mole, no greater than 1,500,000 grams/mole, no greater than 1,000,000 grams/mole, no greater than 750,000 grams/mole, or no greater than 500,000 grams/mole. The weight average molecular weight is often in the range of 50,000 to 2,000,000 grams/mole, in the range of 100,000 to 2,000,000 grams/mole, in the range of 50,000 to 1,000,000 grams/mole, in the range of 100,000 to 1,000,000 grams/mole, in the range of 50,000 to 500,000 grams/mole, or in the range of 100,000 to 500,000 grams/mole.

In addition to the ionic first polymer, the semi-interpenetrating polymeric network further includes a crosslinked second polymer formed in the presence of the ionic first polymer. That is, the two polymers are closely associated and the crosslinked second polymer often at least partially entraps the ionic first polymer through physical entanglement. The crosslinked second polymer can be either ionic or non-ionic.

The semi-interpenetrating network typically contains at least 10 weight percent of the ionic first polymer. If the amount of the ionic first polymer is lower, the semi-interpenetrating network may not be able to function effectively as an ion exchange resin. The semi-interpenetrating network often contains at least 20 weight percent, at least 30 weight percent, or at least 40 weight percent of the ionic first polymer. The semi-interpenetrating network can contain up to 80 weight percent, up to 70 weight percent, up to 60 weight percent, or up to 50 weight percent of the ionic first polymer. If the amount of the ionic first polymer is too high, however, the resulting semi-interpenetrating polymeric network may contain an insufficient amount of the crosslinked second polymer that provides rigidity and strength. Additionally, if the amount of the ionic first polymer is too high, the crosslinked second polymer may be present in an insufficient amount to entrap the ionic first polymer. In some embodiments, the semi-interpenetrating network includes 10 to 80 weight percent, 20 to 80 weight percent, 10 to 60 weight percent, 20 to 60 weight percent, 30 to 60 weight percent, 35 to 55 weight percent, or 40 to 50 weight percent of the ionic first polymer based on the total weight of polymeric material in the semi-interpenetrating network.

The semi-interpenetrating polymeric network often contains 10 to 80 weight percent of the ionic first polymer and 20 to 90 weight percent of the crosslinked second polymer. For example, the semi-interpenetrating polymeric network can contain 20 to 70 weight percent of the ionic first polymer and 30 to 80 weight percent of the crosslinked second polymer, 30 to 70 weight percent of the ionic first polymer and 30 to 70 weight percent of the crosslinked second polymer, 30 to 60 weight percent of the ionic first polymer and 40 to 70 weight percent of the crosslinked second polymer, 30 to 50 weight percent of the ionic first polymer and 50 to 70 weight percent of the crosslinked second polymer, or 35 to 45 weight percent of the ionic first polymer and 55 to 65 weight percent of the crosslinked second polymer.

The crosslinked second polymer is prepared by free radical polymerization of a second monomer composition in the presence of the ionic first polymer. Both the ionic first polymer and the second monomer composition are typically selected to be soluble in an aqueous phase composition. The second monomer composition includes a crosslinking monomer and can optionally include other monomers such as ionic monomers or non-ionic monomers that are soluble in the aqueous phase composition such as in the aqueous-based solvent composition.

Suitable crosslinking monomers for use in the second monomer composition are those that have at least two ethylenically unsaturated groups and that are soluble in water or the aqueous-based solvent composition. Stated differently, the crosslinking monomers are selected to have a lipophilicity index less than or equal to 20. Suitable crosslinking monomers are typically N,N'-alkylenebis(meth)acrylamide, N,N'-heteroalkylenebis(meth)acrylamide, or a combination thereof. These crosslinking monomers have two (meth)acryloyl groups that can react to crosslink one polymeric chain with another polymeric chain or that can react to crosslink one part of a polymeric chain with another part of the same polymeric chain. This crosslinking involves the crosslinked second polymer but not the ionic first polymer.

Suitable N,N'-alkylenebis(meth)acrylamide crosslinking monomers include, but are not limited to, those having an alkylene group with 1 to 10 carbon atoms, 1 to 8 carbon atoms, 1 to 6 carbon atoms, or 1 to 4 carbon atoms. Examples include N,N'-methylenebisacrylamide, N,N'-methylenebismethacrylamide, N,N'-ethylenebisacrylamide, N,N'-ethylenebismethacrylamide, N,N'-propylenebisacrylamide, N,N'-propylenebismethacrylamide, N,N'-hexamethylenebisacrylamide, and N,N'-hexamethylenebismethacrylamide. Suitable N,N'-heteroalkylenebis(meth)acrylamide crosslinking monomers include, but are not limited to, N,N'-cystaminebisacrylamide, N,N'-piperazinebisacrylamide, and N,N'-piperazinebismethacrylamide. These crosslinking monomers are commercially available from various suppliers such as Sigma-Aldrich (Milwaukee, Wis.) and Polysciences, Inc. (Warrington, Pa.). Alternatively, these crosslinking monomers can be synthesized by procedures described in the art such as, for example, in Rasmussen, et al., *Reactive Polymers*, 16, 199-212 (1991/1992).

The second monomer composition includes at least 30 weight percent of a crosslinking monomer based on a total weight of monomers in the second monomer composition. If lower amounts are used, the resulting semi-interpenetrating polymeric network may not have acceptable rigidity. Additionally, higher amounts of the crosslinking monomer in the second monomer composition tend to result in more effective entrapment of the ionic first polymer within the crosslinked second polymer in the resulting semi-interpenetrating network. Some example second monomer compositions include at least 40 weight percent, at least 50 weight percent, at least 60 weight percent, at least 70 weight percent, at least 80 weight percent, at least 90 weight percent, at least 95 weight percent, or at least 98 weight percent crosslinking monomers. Some second monomer compositions contain 50 to 100 weight percent, 70 to 100 weight percent, 80 to 100 weight percent, or 90 to 100 weight percent crosslinking monomer based on the total weight of monomers in the second monomer composition.

Although other monomers can be included in the second monomer composition in addition to the crosslinking monomer, all or substantially all of the monomers in this composition have a lipophilicity index that is less than or equal to 20. As used herein, the term "substantially all" means any monomer present with a lipophilicity index greater than 20 is present as an impurity. Any impurity with a lipophilicity index greater than 20 is present in an amount less than 2 weight percent, less than 1 weight percent, less than 0.5 weight percent, less than 0.2 weight percent, or less than 0.1 weight percent based on the total weight of the monomers in the second monomer composition. In some embodiments, all or substantially all of the monomers in the second monomer composition have a lipophilicity index no greater than 15, no greater than 10, no greater than 5, no greater than 3, or no greater than 1.

Suitable ionic monomers and non-ionic monomers that can be included in the second monomer mixture are that same as those described above for use in the preparation of the ionic first polymer. If ionic monomers are included in the second monomer composition, the charge of the ionic groups (i.e., second ionic groups) on these ionic monomers typically are selected to be opposite to those included in the ionic first polymer. That is, if the ionic first polymer includes acidic groups and/or salts thereof, then the crosslinked second polymer can have basic groups and/or salts thereof. Similarly, if the ionic first polymer includes basic groups and/or salts thereof, then the crosslinked second polymer can have acidic groups and/or salts thereof.

The presence of ionic groups on the crosslinked second polymer that are opposite in charge to those included in the ionic first polymer may facilitate the entrapment of the ionic first polymer within the crosslinked second polymer. However, the number of moles of the second ionic groups on the crosslinked second polymer should be less than the number of moles of the first ionic groups on the ionic first polymer. That is, there should be an excess of first ionic groups remaining on the ionic first polymer (i.e., an excess of first ionic groups on the ionic first polymer that are not attracted to oppositely charged second ionic groups on the crosslinked second polymer) so that the resulting semi-interpenetrating polymeric network can function as an ion exchange resin. Typically, no greater than 50 mole percent of the first ionic groups on the ionic first polymer are attracted to (i.e., balanced by or function as counter ions to) second ionic groups on the crosslinked second polymer. For example, no greater than 40 mole percent, no greater than 30 mole percent, no greater than 20 mole percent, no greater than 10 mole percent, or no greater than 5 mole percent of the first ionic groups on the ionic first polymer are attracted to second ionic groups on the crosslinked second polymer.

Any amount of an ionic monomer can be included in the second monomer composition used to form the crosslinked second polymer provided that there is an adequate amount of the crosslinking monomer present. In some embodiments, the second monomer composition can contain up to 50 percent ionic monomer based on the total weight of monomers in the second monomer composition. For example, the second monomer composition can contain up to 40 weight percent, up to 30 weight percent, up to 20 weight percent, up to 10 weight percent, or up to 5 weight percent ionic monomer. The second monomer composition can contain at least 1 weight percent, at least 2 weight percent, at least 5 weight percent, or at least 10 weight percent ionic monomers based on the total weight of monomers in the second monomer composition.

In some embodiments, the second monomer composition contains 50 to 99 weight percent crosslinking monomer and 1 to 50 weight percent ionic monomer based on the total weight of monomers in the second monomer composition. For example, the second monomer composition can contain 50 to 95 weight percent crosslinking monomer and 5 to 50 weight percent ionic monomer, 60 to 95 weight percent crosslinking monomer and 5 to 40 weight percent ionic monomer, 70 to 95 weight percent crosslinking monomer and 5 to 30 weight percent ionic monomer, 80 to 95 weight percent crosslinking monomer and 5 to 20 weight percent ionic monomer, or 90 to 99 weight percent crosslinking monomer and 1 to 10 weight percent ionic monomer.

The crosslinked second polymer is formed in the presence of the ionic first polymer. That is, the free radical polymerization reaction to form the crosslinked second polymer occurs in the presence of the ionic first polymer. The crosslinked second polymer typically at least partially entraps the ionic first polymer through physical entanglements. The weight ratio of the ionic first polymer to the crosslinked second polymer can affect the final properties and characteristics of the semi-interpenetrating polymeric network. In general, the ionic first polymer affects the binding capacity (i.e., ion exchange capacity) of the resulting ion exchange resin. Thus, the capacity of the ion exchange resin typically increases with an increase in the amount of first polymer included in the semi-interpenetrating polymeric network. In general, the crosslinked second polymer affects the rigidity of the semi-interpenetrating polymeric network. Rigidity increases as the extent of crosslinking of the crosslinked second polymer in the semi-interpenetrating polymeric network increases. An increased rigidity is usually desirable if the semi-interpenetrating polymeric network will be used as an ion exchange resin positioned within a chromatographic column. More rigid polymeric particles can typically better withstand the high pressures associated with some chromatographic columns used on a commercial or industrial scale.

The free radical polymerization reaction involved in the formation of the crosslinked second polymer from the second monomer composition typically occurs in an aqueous phase composition. The aqueous phase composition includes an aqueous-based solvent composition (e.g., water or water plus one or more polar solvents) in which the ionic first polymer and the monomers of the second monomer composition are soluble. The aqueous-based solvent composition often includes water plus a mono-alcohol having 1 to 4 carbon atoms. Suitable mono-alcohols include methanol, ethanol, n-propanol, iso-propanol, tert-butanol, or a combination thereof.

In some embodiments, at least 20 weight percent of the aqueous-based solvent composition can be a mono-alcohol. For example, at least 30 weight percent, at least 40 weight percent, or at least 50 weight percent of the aqueous-based solvent composition can be the mono-alcohol. Up to 90 weight percent, up to 80 weight percent, up to 70 weight percent, or up to 60 weight percent of the aqueous-based solvent composition can be the mono-alcohol. For example, the amount of mono-alcohol can be in the range of 20 to 90 weight percent, 20 to 80 weight percent, 20 to 60 weight percent, 30 to 90 weight percent, 30 to 80 weight percent, 30 to 60 weight percent, 40 to 90 weight percent, 40 to 80 weight percent, 50 to 90 weight percent, or 50 to 80 weight percent of the aqueous-based solvent composition.

The aqueous-based solvent composition can also contain additional co-solvents that are miscible with water and the mono-alcohol. Suitable aqueous phase co-solvents include, but are not limited to, dimethylsulfoxide, dimethylformamide, N-methyl pyrrolidone, acetonitrile, and the like. The co-solvent can improve, for example, the solubility of some of the monomers such as the crosslinking monomer in the second monomer composition. Additionally, the co-solvent can influence the phase separation behavior of the forming second polymer and can influence the porosity characteristics of the resultant semi-interpenetrating polymeric network. The aqueous-based solvent typically contains 0 to 20 weight percent additional aqueous phase co-solvents. For example, the aqueous-based solvent can include 0 to 15 weight percent, 0 to 10 weight percent, 1 to 10 weight percent, or 1 to 5 weight percent aqueous phase co-solvents.

The amount of the ionic first polymer, the amount of the second monomer composition, and the amount of aqueous-based solvent composition in the aqueous phase composition are typically selected so that all the monomers and the ionic first polymer are dissolved within the aqueous-based solvent composition. The aqueous-based solvent composition is typically at least 50 weight percent of the total weight of the aqueous phase composition (e.g., the aqueous-based solvent composition, first polymer, and second monomer composition). For example, the aqueous phase composition can contain at least 60 weight percent, at least 70 weight percent, at least 80 weight percent, or at least 90 weight percent aqueous-based solvent composition. In some embodiments, the aqueous phase composition contains 50 to 95 weight percent, 50 to 90 weight percent, 50 to 80 weight percent, 60 to 95 weight percent, or 60 to 90 weight percent aqueous-based solvent composition.

The aqueous phase composition can further include a porogen that is soluble in the aqueous phase composition. The porogen as well as other components in the aqueous phase composition (e.g., the amount of crosslinking monomer and the amount of mono-alcohol) can facilitate the formation of a semi-interpenetrating polymeric network that is macroporous.

As used herein, the term "macroporous" refers to a polymeric material (e.g., a semi-interpenetrating polymeric network) that has a permanent porous structure even in the dry state. Although the polymeric material can swell when contacted with a solvent, swelling is not needed to allow access to the interior of the polymeric material through the porous structure. In contrast, the terms "gel" or "gel-type" are used interchangeably to refer to polymeric material that does not have a permanent porous structure in the dry state but that can be swollen by a suitable solvent to allow diffusional access to the interior of the polymeric material. Both macroporous and gel-type polymeric materials are further described in Sherrington, *Chem. Commun.*, 2275-2286 (1998) and Macintyre, *Macromolecules,* 37, 7628-7636 (2004). The terms macroporous and gel-type are not meant to indicate a particular pore size or a particular range of pore sizes.

Suitable porogens are usually aliphatic and water-soluble. Porogens are not monomers and are free of groups such as ethylenically unsaturated groups that can undergo a free radical polymerization reaction. The porogen, in general, is not covalently attached to the semi-interpenetrating polymeric network and is usually removed after the polymerization reaction of the second monomer composition is complete. During the polymerization reaction, however, a portion of the porogen may covalently bond to the polymeric network through a chain transfer reaction. Preferably, the porogen is not bonded to the polymeric network.

Some suitable porogens are an alkylene oxide or polyalkylene oxide of Formula (III).

$$R^3\text{—}(R^4\text{—}O)_n\text{—}R^5 \tag{III}$$

In this formula, the group $R^3$ is hydroxy, alkoxy, carboxy, acyloxy, or halo; each $R^4$ is independently an alkylene having 1 to 4 carbon atoms; $R^5$ is hydrogen, alkyl, carboxyalkyl, acyl, or haloalkyl; and n is an integer of 1 to 1,000.

In some example porogens of Formula (III), both end groups (i.e., group $—R^3$ and group $—OR^5$) are hydroxy groups (i.e., $R^3$ is hydroxy and $R^5$ is hydrogen). In other example porogens, $R^3$ is hydroxy and $R^5$ is an alkyl (e.g., an alkyl having 1 to 20, 1 to 10, 1 to 6, or 1 to 4 carbon atoms), haloalkyl (e.g., chloroalkyl such as chloromethyl), acyl (e.g., acetyl), or carboxyalkyl (e.g., carboxymethyl). That is, one end group is hydroxy and the other end group is an alkoxy, haloalkoxy, acyloxy, or carboxy (e.g., carboxyalkoxy, which is an alkoxy substituted with a carboxy). In other example porogens, $R^3$ is an alkoxy (e.g., an alkoxy having 1 to 10, 1 to 6, or 1 to 4 carbon atoms) and $R^5$ is an alkyl (e.g., an alkyl having 1 to 10, 1 to 6, or 1 to 4 carbon atoms) or an acyl (e.g., acetyl). That is, one end group is an alkoxy and the other end group is an alkoxy or acyloxy. In still other example porogens, $R^3$ is carboxy and $R^5$ is carboxy alkyl (e.g., carboxymethyl). That is, both end groups are carboxy ($—OR^5$ is carboxyalkoxy).

Group $R^4$ in Formula (III) is an alkylene such as, for example, ethylene or propylene. Suitable porogens with ethylene $R^4$ groups include ethylene glycol and ethylene glycol based materials such as diethylene glycol, triethylene glycol, and higher homologs. The higher homologs of ethylene glycol are often referred to as polyethylene glycol (i.e., PEG) or polyethylene oxide (i.e., PEO). Suitable porogens with propylene $R^4$ groups include propylene glycol and propylene glycol based materials such as dipropylene glycol, tripropylene glycol, and higher homologs. The higher homologs of propylene glycol are often referred to as polypropylene glycol (i.e., PPG) or polypropylene oxide (i.e., PPO). The porogens can be random or block copolymers of polyethylene oxide and polypropylene oxide.

Subscript n in Formula (III) can be an integer greater than 1, greater than 2, greater than 5, greater than 10, greater than 20, greater than 50, greater than 100, greater than 200, or greater than 500. For example, n can be an integer in the range of 1 to 1,000, in the range of 1 to 800, in the range of 1 to 600, in the range of 1 to 500, in the range of 1 to 200, or in the range of 1 to 100.

Some porogens of Formula (III) are polyalkylene oxides having a molecular weight of at least 200 grams/mole, at least 400 grams/mole, at least 800 grams/mole, at least 1,000 grams/mole, at least 2,000 grams/mole, at least 4,000 grams/ mole, at least 8,000 grams/mole, or at least 10,000 grams/ mole. The polyalkylene oxide porogens often have an average molecular weight up to 20,000 grams/mole, up to 16,000 grams/mole, up to 12,000 grams/mole, up to 10,000 grams/ mole, up to 8,000 grams/mole, up to 6,000 grams/mole, up to 4,000 grams/mole, up to 2,000 grams/mole, or up to 1,000 grams/mole. For example, the polyalkylene oxide porogen typically has an average molecular weight in the range of 200 to 20,000 grams/mole, in the range of 200 to 16,000 grams/ mole, in the range of 200 to 8,000 grams/mole, in the range of 200 to 4,000 grams/mole, in the range of 200 to 2,000 grams/ mole, in the range of 200 to 1,000 grams/mole, in the range of 500 to 4,000 grams/mole, in the range of 1,000 to 4,000 grams/mole, or in the range of 1,000 to 3,000 grams/mole.

Polyalkylene oxides are commercially available that have end groups (i.e., groups $R^3$ and $—OR^5$) selected from hydroxy, methoxy, a combination of hydroxy and methoxy, a combination of hydroxy and chloro, a combination of alkoxy and acetoxy, or at least one carboxy group. Such materials can be obtained, for example, from Sigma-Aldrich (Milwaukee, Wis.), Nektar (Huntsville, Ala.), and Dow Chemical (Midland, Mich.).

Other suitable porogens are aliphatic compounds having at least three hydroxyl groups. For example, the porogen can have a hydroxyl to carbon molar ratio that is at least 0.5. In some embodiments, the hydroxyl to carbon molar ratio is at least 0.6, at least 0.8, or at least 1.0. The weight average molecular weight of the porogen can often be up to 10,000 grams/mole, up to 9,000 grams/mole, up to 8,000 grams/ mole, up to 6,000 grams/mole, up to 4,000 grams/mole, up to 2,000 grams/mole, up to 1,000 grams/mole, or up to 500 grams/mole.

Some example porogens are sugars such as monosaccharides, disaccharides, or polysaccharides. Suitable monosaccharides include, but are not limited to, erythrose, threose, ribose, arabinose, xylose, lyxose, allose, altrose, glucose, mannose, gulose, idose, galactose, talose, fructose, sorbose, ribulose, and sedoheptulose. Suitable disaccharides include, but are not limited to, sucrose, maltose, and lactose. Suitable polysaccharides include, but are not limited to, maltotriose and dextran.

Other example porogens are derivatives of monosaccharides of formula $HOCH_2(CHOH)_pCHO$ where p is an integer equal to 2, 3, or 4. Suitable derivatives have at least three hydroxy groups. Some of the derivatives are oxidized products of monosaccharides. The oxidized product can be a monocarboxylic acid of formula $HOCH_2(CHOH)_pCOOH$ such as gluconic acid (i.e., from glucose) or mannoic acid (i.e., from mannose); a dicarboxylic acid of formula $HOOC(CHOH)_pCOOH$ such as glucaric acid (i.e., from glucose), mannaric acid (i.e., from mannose), xylaric acid (i.e., from xylose), or tartaric acid (i.e., from threose); a polyhydroxy alcohol of formula $HOCH_2(CHOH)_pCH_2OH$ such as glucitol (i.e., from glucose), mannitol (i.e., from mannose) or ribitol (i.e., from ribose); or an aldehydo acid of formula $HOOC(CHOH)_pCHO$ such as glucuronic acid (i.e., from glucose) or mannuronic acid (i.e., from mannose). Still other derivatives of monosaccharides are amino derivatives that have at least one hydroxy group replaced with an amino group. Suitable amino derivatives of monosaccharides include, but are not limited to, glucosamine and glucamine. Additional derivatives of monosaccharides are alkoxy derivatives that have at least one hydroxy group replaced with an alkoxy group. Suitable alkoxy derivatives of monosaccharides include, but are not limited to, methylglucopyranoside, methylgalactopyranoside, and 3-O-methylglucopyranose.

Still other example porogens are polyols having at least three hydroxy groups such as, for example, glycerol, inositol, pentaerythritol, trimethylolethane, trimethylolpropane, dipentaerythritol, and tripentaerythritol.

An initiator can be added to the aqueous phase composition to commence the free radical polymerization reaction of the second monomer composition. The free radical initiator is usually soluble in the aqueous-based solvent composition. The free radical initiator can be activated thermally, photochemically, or through an oxidation-reduction reaction. The free radical initiator is often used in an amount in the range of 0.02 to 10 weight percent based on a total weight of the monomers in the second monomer composition. In some examples, the free radical initiator is present in an amount of 2 to 6 weight percent based on the total weight of the monomers in the second monomer composition.

Suitable water-soluble thermal initiators include, for example, azo compounds, peroxides or hydroperoxides, persulfates, and the like. Example azo compounds include 2,2'-azobis[2-(2-imidazolin-2-yl)propane]dihydrochloride, 2,2'-azobis(2-amidinopropane)dihydrochloride, and 4,4'-azobis-(4-cyanopentanoic acid). Examples of commercially available thermal azo compound initiators include materials available from DuPont Specialty Chemical (Wilmington, Del.) under the "VAZO" trade designation such as VAZO 44, VAZO 56, and VAZO 68. Suitable peroxides and hydroperoxides include acetyl peroxide, tert-butyl hydroperoxide, cumene hydroperoxide, and peroxyacetic acid. Suitable persulfates include, for example, sodium persulfate and ammonium persulfate.

In other examples, the free radical initiator is a redox couple such as ammonium or sodium persulfate and N,N,N', N'-tetramethylethylenediamine (TMEDA); ammonium or sodium persulfate and ferrous ammonium sulfate; hydrogen peroxide and ferrous ammonium sulfate; cumene hydroperoxide and N,N-dimethylaniline; or the like.

The polymerization reaction conditions such as the temperature and the reaction time depend on the specific free radical initiator that is selected. The temperature is often about 50° C. to 150° C. for thermally initiated polymerization reactions. In some methods, the temperature is in the range of 55° C. to 100° C. For redox or photochemically initiated polymerization reactions, the temperature can be close to room temperature or below, if desired. The reaction time can be in the range of 30 minutes to 24 hours or more. Typically a reaction time of 2 to 4 hours is sufficient.

In some embodiments, the aqueous phase composition is the only phase present at the start of the of the polymerization reaction of the second monomer composition. As the polymerization reaction proceeds, the resulting semi-interpenetrating polymeric network often precipitates from the aqueous phase. The final product can be in the form of a monolith of any shape such as the shape of a block or the container used to prepare the semi-interpenetrating polymeric network. If desired, particles can be formed from the monolith by cutting, crushing, fracturing, milling, or the like. These particles can have a regular or irregular shape that is uniform or nonuniform is size.

In other embodiments, an inverse suspension polymerization process is used to form the semi-interpenetrating polymeric network. In the inverse suspension polymerization process, the aqueous phase composition is dispersed or suspended in an organic phase that is not miscible with the aqueous phase composition. More specifically, the method includes forming an aqueous phase composition that contains an ionic first polymer, a second monomer composition, and an aqueous-based solvent composition. The ionic first polymer is soluble in the aqueous phase composition and has a first ionic group. The second monomer composition is soluble in the aqueous phase composition and contains at least 30 weight percent of a crosslinking monomer based on a total weight of monomer in the second monomer composition. The aqueous-based solvent composition contains water. The method further includes suspending the aqueous phase composition in an organic phase that includes a non-polar organic solvent and polymerizing the second monomer composition to form particles of a semi-interpenetrating polymer network.

The volume ratio of non-polar organic solvent in the organic phase to the aqueous phase composition is usually in the range of 2:1 to 6:1. The aqueous phase composition, which contains the second monomer composition, the ionic first polymer and the aqueous-based solvent composition, is often dispersed as relatively small droplets in the organic phase, which is usually predominately the non-polar organic solvent. Besides functioning as an inert medium for dispersion of the aqueous phase composition, the primary purpose of the suspending medium (i.e., the organic phase) is to dissipate the heat generated during the polymerization reaction. In some embodiments, the density of the suspension medium can be selected to be approximately the same as the aqueous phase composition. Approximately matching these densities tends to result in the formation of more spherical as well as more uniformly sized particles of the semi-interpenetrating polymeric network.

Suitable non-polar organic solvents for use in the organic phase are typically alkanes such as hexane, heptane, n-octane, isooctane, isododecane, and cyclohexane; isoparaffins such as those commercially available from Exxon Mobil (Fairfax, Va.) under the trade designation "ISOPAR"; halogenated hydrocarbons such as carbon tetrachloride, chloroform, and methylene chloride; aromatics such as benzene and toluene; low-viscosity silicone oils; mineral oil; ethers such as methyl-tert-butyl ether (MBTE); or combinations thereof. For example, the non-polar organic solvent can be a mixture of heptane and methylene chloride or heptane and toluene.

A suspending agent (i.e., polymeric stabilizer) is often used to facilitate suspension of the aqueous phase composition droplets in the organic phase (e.g., in the non-polar organic solvent). Unlike the porogen that is hydrophilic, the suspending agent usually has both hydrophobic and hydrophilic portions. The suspending agent functions to modify the interfacial tension between the aqueous phase composition and the non-polar organic solvent. Additionally, the suspending agent provides steric stabilization of the aqueous phase composition droplets. This steric stabilization tends to minimize or prevent the formation of agglomerated particles during the polymerization process.

Suitable suspending agents include sorbitan sesquioleate, polyethylene oxide (20) sorbitan trioleate, polyethylene oxide (20) sorbitan monooleate, sorbitan trioleate, sodium di-2-ethylhexylsulfosuccinate, a copolymer of isooctylacrylate and acrylic acid, a copolymer of hexylacrylate and acrylic acid or sodium acrylate, a copolymer of isooctylacrylate and 2-acrylamidoisobutyramide, and the like. The amount of suspending agent can influence the size of the semi-interpenetrating polymeric network particles (i.e., the use of larger amounts of suspending agent often results in the formation of smaller semi-interpenetrating polymeric network particles). The amount of the suspending agent is generally in the range of 0.1 to 10 weight percent based on the total weight of the monomers in the second monomer composition. For example, the organic phase composition can contain 0.1 to 8 weight percent or 0.5 to 5 weight percent suspending agent based on the total weight of monomers in the second monomer composition.

The size of the resulting semi-interpenetrating polymeric network particles is determined, to a large extent, by the size of the aqueous phase composition droplets. The droplet size can be affected by variables such as the rate of agitation, the temperature, the reactor geometry, the amount of suspending agent, the choice of suspending agent, the choice of non-polar organic solvent, and the choice of the aqueous-based solvent composition. The rate of agitation, the type of suspending agent, and the amount of suspending agent can often be varied to control the level of aggregation or agglomeration of the resulting particles. A lack of aggregation is generally preferred.

As the free radical polymerization reaction proceeds, many polymeric molecules (i.e., molecules of the growing second polymer) are formed within each aqueous phase droplet. The polymeric molecules continue to grow and crosslink as the reaction proceeds. The growth and crosslinking occurs in the presence of the ionic first polymer. When the molecular weight becomes sufficiently large, a polymeric phase separates from the aqueous phase composition within the droplet. This polymeric phase typically includes the ionic first polymer entrapped within the growing second polymer. Although not wanting to be bound by theory, it is believed that the pores are formed, at least in part, by the exclusion of the aqueous solvent from the polymeric phase as the molecular weight increases. The point at which phase separation occurs can influence the average pore size and the pore size distribution. A later phase separation tends to favor the formation of polymeric particles (i.e., semi-interpenetrating polymeric network particles) that have smaller pores and larger surface areas. Conversely, an earlier phase separation tends to favor the formation of polymeric particles that have larger pores and smaller surface areas.

The point at which phase separation occurs can be affected by the addition of an optional porogen. The porogen is usually a liquid that can function as a conventional solvent for the second monomer composition within the aqueous phase composition. Useful porogens generally do not partition between the aqueous phase composition and the non-polar organic solvent to any appreciable extent (i.e., the porogen is not extracted in any appreciable amount from the aqueous phase composition into the non-polar solvent).

Porogens that are compatible with the forming polymeric material (e.g., porogens that are good solvents for the growing second polymer) tend to result in a later phase separation compared to porogens that are less compatible with the forming polymeric material (e.g., porogens that are poor solvents for the growing second polymer). Porogens with a higher solubility for the forming polymeric material tend to result in the formation of polymeric particles that have smaller pores and larger surface areas compared to porogens having a lower solubility for the forming polymeric material. Conversely, porogens with a lower solubility for the forming polymeric material tend to result in the formation of polymeric particles that have larger pores and smaller surface areas compared to porogens having a greater solubility for the forming polymeric material.

Additionally, the point at which phase separation occurs during the polymerization reaction can be affected by the amount of crosslinking monomer present in the second monomer mixture, with larger amounts of crosslinking monomer typically favoring earlier phase separation due to a more rapid increase in the molecular weight of the growing second polymer.

When the semi-interpenetrating polymeric network is prepared using the inverse suspension polymerization method, polymeric beads are formed. The average size of the polymeric beads can be determined using techniques such as light scattering or electron microscopy with image analysis. The polymeric beads usually have an average diameter of at least 10 micrometers. For example, the polymeric beads can have an average diameter of at least 20 micrometers, at least 30 micrometers, at least 40 micrometers, at least 50 micrometers, or at least 60 micrometers. The polymeric beads usually have an average diameter no greater than 2,000 micrometers, no greater than 1,000 micrometers, no greater than 500 micrometers, or no greater than 200 micrometers. In some applications, the polymeric beads have an average diameter of 10 to 2,000 micrometers, 20 to 2,000 micrometers, 20 to 500 micrometers, 50 to 500 micrometers, 20 to 200 micrometers, 50 to 200 micrometer, 50 to 100 micrometers, 50 to 75 micrometers, 50 to 70 micrometers, or 60 to 70 micrometers.

If the average size of the semi-interpenetrating polymeric network particles (e.g., beads) is less than about 10 micrometers or less than about 20 micrometers, then the back pressure in a chromatographic column filled with the particles may become unacceptably large, especially for the large columns (e.g., columns with a diameter greater than about 5 cm) that can be used for the purification, separation, or immobilization of large biological molecules. Although the average particle size can be as large as 2,000 micrometers, the average particle size for some applications (e.g., applications in which the semi-interpenetrating polymeric network particles are placed in large columns) is often no greater than 200 micrometers. If the average particle size is larger, the efficiency of the chromatographic process may be low, especially for the purification, separation, or immobilization of large biological molecules such as proteins that often have low diffusion rates into the pores of the semi-interpenetrating polymeric network. For example, to achieve the same degree of separation, purification, or immobilization with larger anion exchange resins that can be obtained using anion exchange resins of 20 to 200 micrometers, a greater amount of the semi-interpenetrating polymeric network particles, a longer chromatographic column, a slower flow rate, or a combination thereof may be needed.

The porosity and surface area of the semi-interpenetrating polymeric network particles can be characterized by adsorbing nitrogen onto the surface of the particles at various relative pressures under cryogenic conditions (i.e., a sample of the semi-interpentrating polymeric network particles) within a tube is subjected to a vacuum and the tube is placed in liquid nitrogen for cooling). Nitrogen is adsorbed on the surface of the sample at multiple relative pressures (e.g., from about 0.0 to about 1.0) and then desorbed at multiple relative pressures. BJH theory, which is further described in E. P. Barrett, L. S. Joyner, and P. P. Halenda, *J. Am. Chem. Soc.*, 73, 373 (1951), can be used to relate the amount of nitrogen adsorbed or desorbed at the multiple relative pressures to pores having pore diameters in the range of about 2 to about 200 nanometers. The pore volume, surface area, and average pore diameter can be calculated. As used herein, the term "pore volume" refers to the cumulative pore volume calculated using BJH theory from the adsorption of nitrogen at various relative pressures from about 0.0 to about 1.0. As used herein, the term "surface area" refers to the cumulative surface area calculated using BJH theory from the adsorption of nitrogen at various relative pressures from about 0.0 to about 1.0. As used herein, the term "average pore diameter" is the average pore diameter measured using BJH theory from the adsorption of nitrogen at various relative pressures from about 0.0 to about 1.0.

The semi-interpenetrating polymeric network particles have a distribution of pore sizes. The pore diameters can be up to 500 nanometers or larger. The semi-interpenetrating polymeric network particles have pores in the size range that can be measured using nitrogen adsorption techniques. That is, at least some of the pores have a diameter less than 200 nanometers, less than 150 nanometers, or less than 100 nanometers. The average pore diameter measured by nitrogen adsorption is typically at least 2 nanometers, at least 5 nanometers, at least 10 nanometers, at least 20 nanometers, or at least 30 nanometers. The average pore diameter can be up to 200 nanometers, up to 100 nanometers, or up to 80 nanometers. For example, the average pore diameters can be in the range of 10 to 200 nanometers, in the range of 10 to 100 nanometers, in the range of 10 to 80 nanometers, in the range of 20 to 100 nanometers, or in the range of 20 to 80 nanometers.

The pore volume is often at least 0.10 cubic centimeters per gram. For example, the pore volume can be at least 0.15 cubic centimeters per gram, at least 0.20 cubic centimeters per gram, or at least 0.25 cubic centimeters per gram. The pore volume can be in the range of 0.10 to 2 cubic centimeters per gram, in the range of 0.15 to 2 cubic centimeters per gram, or in the range of 0.2 to 2 cubic centimeters per gram resulting from pores having a diameter no greater than 200 nanometers. The pores are large enough to accommodate the biological materials but small enough to provide adequate surface area and anion exchange capacity.

The surface area is usually at least 20 meters squared per gram ($m^2/g$), at least 30 $m^2/g$, at least 40 $m^2/g$, or at least 50 $m^2/g$. The surface area is often in the range of 20 to 300 $m^2/g$, in the range of 40 to 300 $m^2/g$, or in the range of 50 to 300 $m^2/g$.

The particles of the semi-interpenetrating polymeric network prepared by inverse suspension polymerization methods can be isolated, for example, by filtration or decantation. If a porogen was used in the preparation, the particles can then be subjected to a series of washing steps to remove the porogen. Suitable solvents for removing the porogen include polar solvents such as, for example, water, acetone, alcohols (e.g., methanol, ethanol, n-propanol, and iso-propanol), dimethylsulfoxide, dimethylformamide, N-methylpyrrolidone, acetonitrile, and the like. The resulting particles can be dried using any suitable method, if desired. In some methods, the resulting particles can be fractionated using techniques such as screening, sedimentation, and air classification.

In another aspect, a method of separating, purifying, or immobilizing an ionic material is provided. The method includes providing a semi-interpenetrating polymeric network as described above. The method further includes contacting the semi-interpenetrating polymeric network with an ionic material having a charge that is opposite that of the first ionic group. The method still further includes adsorbing at least a portion of the ionic material on the semi-interpenetrating polymeric network.

The ionic material is often referred to as a target compound. The target compound can be separated, purified, or immobilized. In some embodiments, the target compound is a biomolecule such as, for example, a virus, protein, enzyme, vaccine, cell debris, DNA, or RNA. In some applications, the composition of the sample can be adjusted to enhance the likelihood that the target compound in the sample can react or interact with one of the ionic groups of the semi-interpenetrating polymeric network. For example, the sample pH can be adjusted to optimize the separation, purification, or immobilization of charge-carrying biomolecules using a semi-interpenetrating polymeric network having an ionic group selected from an acidic group and/or a salt thereof or a basic group and/or a salt thereof.

The capacity (e.g., dynamic or static ion exchange capacity) of the semi-interpenetrating polymeric network can be given in terms of the amount of the target compound that can interact or react with the semi-interpenetrating polymeric network. The ion exchange capacity can be altered depending on a number of variables such as, for example, the selection of the ionic first polymer and the ratio of the ionic first polymer to the crosslinked second polymer. Semi-interpenetrating polymeric networks that function as cation exchange resins can interact with various target compounds that have a positively charged group. More particularly, the cation exchange capacity can be given in terms of the amount of a specific protein such as immunoglobulin (e.g., IgG) that can be adsorbed by the polymeric resins. Semi-interpenetrating polymeric networks that function as anion exchange resins can interact with various target compounds that have a negatively charged group. More particularly, the anion exchange capacity can be given in terms of the amount of a specific protein such as bovine serum albumin (BSA) that can be adsorbed. The capacity for IgG or BSA can be, for example, at least 20 mg/mL, at least 30 mg/mL, at least 40 mg/mL, or at least 50 mg/mL. Some example semi-interpenetrating polymeric networks have a capacity in the range of 40 to 300 mg/mL, in the range of 50 to 300 mg/mL, in the range of 75 to 300 mg/mL, in the range of 100 to 300 mg/mL, in the range of 50 to 250 mg/mL, in the range of 75 to 250 mg/mL, in the range of 50 to 200 mg/mL, in the range of 75 to 200 mg/mL, or in the range of 100 to 200 mg/mL.

The capacity of the semi-interpenetrating network particles is often surprisingly high. Although not wishing to be bound by theory, this higher than expected capacity may be attributable to a portion of the ionic first polymer extending beyond (e.g., away from) the surface of the semi-interpenetrating polymeric network particles. The ionic groups on this extended portion of the ionic first polymer may be more available to interact with target compounds. Because the concentration of ionic groups in the extended portion is often relatively high, the probability of interactions with a target compound can be increased.

If the ionic first polymer has an acidic group and/or salt thereof, the semi-interpenetrating polymeric network can usually function as a cation exchange resin. A sample can be contacted with the semi-interpenetrating polymeric network at a pH where the cation exchange resin has negatively charged groups and the target compound has a positively charged group. The target compound can be adsorbed on the cation exchange resin. To release the adsorbed target compound from the cation exchange resin, the pH can be raised (e.g., the pH is raised to at least 6 or 7 or higher). Alternatively, when the target compound is a biomolecule, the sample can be contacted with and adsorbed on the cation exchange resin in a low ionic strength buffer (e.g., 5 to 50 millimolar buffer salt plus 0 to 200 millimolar sodium chloride) at a pH of about 3 to 10 or at a pH of about 4 to 6. To release the adsorbed biomolecule, the cation exchange resin is often contacted with a high ionic strength buffer. In some embodiments, the high ionic strength buffer includes that same buffer composition used to adsorb the target compound plus 1 molar sodium chloride. The adsorption and release processes are typically performed at temperatures near room temperature.

Buffer salts useful for controlling pH for cation exchange resins include, but are not limited to, sodium phosphate, sodium carbonate, sodium bicarbonate, sodium borate, sodium acetate, and TRIS (tris(hydroxymethyl)aminomethane). Other suitable buffers include "Good's" buffers such as MOPS (3-morpholinopropanesulfonic acid), EPPS (4-(2-hydroxyethyl)piperazine-1-propanesulfonic acid), MES (2-morpholinoethanesulfonic acid), and others.

Cation exchange resins can be used, for example, to purify, immobilize, or separate biomolecules such as various antibodies or enzymes, or other positively charged proteins.

If the ionic first polymer has a basic group and/or a salt thereof, the semi-interpenetrating polymeric network can usually function as an anion exchange resin. A sample can be contacted with an anion exchange resin at a pH where the anion exchange resin has positively charged groups (e.g., at a pH of 1 to 10) and the target compound has a negatively charged group. In general, in order to get effective adsorption of the negatively charged target compound to the anion exchange resin, a pH of at least about 1 to 2 pH units above the pK of the target compound (or pI for a protein) can be used. To release the adsorbed target compound from the anion exchange resin, if desired, the pH can be lowered at least 1 to 2 pH units, or more. Alternatively, when the charged target compound is a biomolecule, the sample can be contacted with the anion exchange resin in a low ionic strength buffer (e.g., a 5 to 50 millimolar buffer salt plus 0 to 200 millimolar sodium chloride) at an appropriate pH (e.g., at a pH of about 6-8 for bovine serum albumin). To release the adsorbed biomolecule, the anionic exchange resin is often contacted with a high ionic strength buffer. In some embodiments, the high ionic strength buffer includes that same buffer composition used to adsorb the target compound plus 1 molar sodium chloride. The adsorption and release processes are typically performed at temperatures near room temperature.

Buffer salts useful for controlling pH for anion exchange resins include, but are not limited to, sodium phosphate, sodium carbonate, sodium bicarbonate, sodium borate, sodium acetate, and TRIS (tris(hydroxymethyl)aminomethane). Other suitable buffers include "Good's" buffers such as MOPS (3-morpholinopropanesulfonic acid), EPPS (4-(2-hydroxyethyl)piperazine-1-propanesulfonic acid), MES (2-morpholinoethanesulfonic acid), and others.

Anion exchange resins can be used, for example, to purify, immobilize, or separate various biomolecules such as host cell proteins and other positively charged proteins, nucleic acids, cells, cell debris, and viruses.

In some embodiments of the method of purifying, immobilizing, or separating a target compound, the semi-interpenetrating polymeric network that functions as an ion exchange resin can be placed in a column to prepare a chromatographic column. Suitable columns are known in the art and can be constructed of such materials as glass, polymers, stainless steel, titanium and alloys thereof, or nickel and alloys thereof. Methods of filling the column to effectively pack the ion exchange resin in the column are known in the art.

The semi-interpenetrating polymeric networks are typically fairly rigid and can have the mechanical strength needed for use in chromatographic columns of any suitable dimension under any suitable flow rate and pressure conditions. The semi-interpenetrating polymeric networks can be used, for example, in a chromatographic column with high flow rates. The semi-interpenetrating polymeric networks are suitable for use under the differential pressure conditions that are commonly encountered in chromatographic columns. As used herein, the term "differential pressure" refers to the pressure drop across a chromatographic column. For example, chromatographic columns used for the downstream purification or separation of therapeutic proteins can be used with superficial velocities (e.g., flow rates) such as at least 150 cm/hr, at least 250 cm/hr, at least 500 cm/hr, or at least 700 cm/hr to increase productivity. Faster flow rates typically lead to higher productivity.

The chromatographic columns can be part of an analytical instrument such as a liquid chromatograph. Alternatively, the chromatographic column can be part of a preparative liquid chromatographic system and can be on any suitable scale such as a laboratory scale, pilot plant scale, or production scale. When packed with the semi-interpenetrating polymeric networks, the chromatographic column can be used to separate, purify, or immobilize a target compound. The target compound can react or interact with the charged groups on the semi-interpenetrating polymeric networks. Alternatively, impurities in the sample can be removed resulting in an increase in the purity or concentration of the target compound in the sample. The amount of the target compound or impurities in a sample containing the target compound can be determined.

In yet another aspect, an article is provided. The article includes a porous support and a semi-interpenetrating polymeric network particle that is incorporated into the porous support, positioned on a surface of the porous support, or a combination thereof. The semi-interpenetrating polymeric network is the same as described above.

In some embodiments, the porous support of the article is a filtration medium. The filter medium can be positioned within a housing to provide a filter cartridge. Suitable filtration medium and systems that include a filter cartridge are further described, for example, in U.S. Pat. No. 5,468,847 (Heilmann et al.). Such a filter cartridge can be used, for example, to purify, immobilize, or separate biomolecules. Smaller semi-interpenetrating polymeric network particles can be utilized within a filter cartridge compared to within a chromatographic column due to the lower pressure drops inherent in the filter cartridge system.

The filtration medium can have a single filtration layer or multiple filtration layers and can be prepared from glass or polymeric fibers (e.g., polyolefin fibers such as polypropylene fibers). In some embodiments, the filtration medium includes a coarse pre-filtration layer and one or more filtration layers that are finer. For example, the filtration medium can include a coarse pre-filtration layer and then a series of additional filtration layers with progressively smaller average pore sizes. Particles of the semi-interpenetrating polymeric network can be positioned on the layer of the filtration medium having the smallest average pore size.

Selection of the pore size of the filtration medium depends on the size of the particles of the semi-interpenetrating polymeric network. Typically the pore size of the filtration medium is selected to be smaller than the average diameter of the particles. However, a portion of the particles can penetrate into the filtration medium.

The filtration medium can be in the form of vertical pleated filters such as those described in U.S. Pat. No. 3,058,594 (Hultgren). In other embodiments, the filtration medium is in the form of horizontal, compound radially pleated filters such as those described in U.S. Pat. No. 4,842,739 (Tang et al.). A horizontal arrangement of the pleats can be desirable in applications where a filter cartridge containing the filtration medium is used in the vertical direction. Such an arrangement can reduce the loss of the polymeric resin from the filter element during use and storage.

In other articles, particles of the semi-interpenetrating polymeric network are incorporated in a porous support such as a porous matrix. The porous matrix is typically a porous woven or non-woven fibrous web, porous fiber, porous membrane, porous film, hollow fiber, or tube. Suitable continuous, porous matrixes are further described, for example, in U.S. Pat. No. 5,993,935 (Rasmussen et al.).

The use of a fibrous web as the porous support can provide advantages such as, for example, large surface area, ease of manufacture, low material cost, and a variety of fiber textures and densities. Although a wide range of fiber diameters are suitable, the fibers often have an average diameter of 0.05 micrometers to 50 micrometers. The web thickness can be varied to fit the end use application (e.g., about 0.2 micrometers to about 100 cm).

The article can be prepared, for example, using melt-blowing methods. For example, a molten polymeric material can be extruded to produce a stream of melt blown fibers. Particles of the semi-interpenetrating polymeric network can be introduced into the stream of fibers and intermixed with the fibers. The mixture of fibers and particles can be collected on a screen such that a web is formed. The particles can be dispersed within the fibrous web. In some embodiments, the particles can be dispersed uniformly throughout the fibrous web. The fibers can be prepared of any suitable material such as various polymeric materials, ceramic materials, or a combination thereof.

In other examples, the article can be prepared using wet-laid methods. For example, a slurry of various fibers and the semi-interpenetrating polymeric particles can be prepared. For example, the slurry can be prepared by mixing water, various fibers and the semi-interpenetrating polymeric network. The liquid in the slurry can then be removed to form the article. The liquid can be removed by decantation or filtering. The article can have any desired shape by placing the slurry in a mold prior to removal of the liquid. The fibers can be prepared of any suitable material such as various polymeric materials, ceramic materials, or a combination thereof.

In some embodiments of the wet-laid method, the semi-interpenetrating polymeric network particles are combined with a fibrillated polymer fiber such as a fibrillated polyolefin (e.g., fibrillated polyethylene). Other fibers such as nylon fibers, fiber glass, or combinations thereof can be mixed with the fibrillated polymer fiber. Such articles can contain, for example, up to 75 weight percent, up to 80 weight percent, up to 85 weight percent, or up to 90 weight percent semi-interpenetrating polymeric network particles based on a total weight of the semi-interpenetrating polymeric network particles and the porous support. The backpressure resulting from the use of these articles tends to be relatively low.

The article can also be prepared with a fibrillated polymer matrix such as fibrillated polytetrafluoroethylene (PTFE). Suitable methods are more fully described in U.S. Pat. No. 4,153,661 (Ree et al.), U.S. Pat. No. 4,565,663 (Errede et al.), U.S. Pat. No. 4,810,381 (Hagen et al.), and U.S. Pat. No. 4,971,736 (Hagen et al.) and in European Patent No. 0498557 (Markell et al.). In general, these methods involve blending the semi-interpenetrating polymeric network with a polytetrafluoroethylene dispersion to obtain a putty-like mass, subjecting the putty-like mass to intensive mixing at a temperature of 5° C. to 100° C. to cause fibrillation of the PTFE, biaxially calendaring the putty-like mass, and drying the resultant sheet. Articles prepared with a fibrillated polymer matrix can be prepared, for example, to contain up to 75 weight percent, up to 80 weight percent, up to 85 weight percent, up to 90 weight percent, or up to 95 weight percent semi-interpenetrating polymeric network particles based on a total weight of the particles and the polymer matrix.

In another method of preparing the article, particles of the semi-interpenetrating polymeric matrix can be dispersed in a liquid and then blended with a thermoplastic polymer at a temperature sufficient to form a homogenous mixture. The homogeneous mixture can be placed in a mold having a desired shape. Upon cooling of the mixture, the liquid can be phase separated leaving a thermoplastic polymeric matrix that contains dispersed polymeric particles. This method is further described in U.S. Pat. No. 4,957,943 (McAllister et al.).

The amount of the semi-interpenetrating polymeric network that is incorporated into the porous support is typically at least 1 volume percent, at least 5 volume percent, at least 10 volume percent, at least 20 volume percent, at least 30 volume percent, at least 40 volume percent, or at least 50 volume percent based on the volume of the resulting composite. The amount of the semi-interpenetrating polymeric network that is incorporated into the porous support can contain up to 99 volume percent, up to 95 volume percent, up to 90 volume percent, up to 85 volume percent, or up to 80 volume percent based on the volume of the resulting composite. Articles having a larger amount of semi-interpenetrating polymeric network tend to have a larger capacity.

Various items are provided that are semi-interpenetrating polymeric networks, method of using the semi-interpenetrating polymeric networks, methods of making the semi-interpenetrating polymeric networks, or articles that contain the semi-interpenetrating polymeric networks.

Item 1 is a polymeric material comprising a semi-interpenetrating polymeric network comprising: an ionic first polymer having a first ionic group; and a crosslinked second polymer prepared by free radical polymerization of a monomer composition in the presence of the ionic first polymer, the second monomer composition comprising at least 30 weight percent of a crosslinking monomer based on a total weight of monomer in the monomer composition.

Item 2 is the polymeric material of item 1, wherein the polymeric material comprises at least 10 weight percent of the ionic first polymer.

Item 3 is the polymeric material of item 1 or 2, wherein the crosslinked second polymer has a second ionic group with a charge that is opposite that of the first ionic group.

Item 4 is the polymeric material of any one of items 1 to 3, wherein the crosslinked second polymer is non-ionic.

Item 5 is the polymeric material of any one of items 1 to 4, wherein the semi-interpenetrating polymeric network is in the form of a bead.

Item 6 is the polymeric material of any one of items 1 to 5, wherein the semi-interpenetrating polymeric network is macroporous.

Item 7 is the polymeric material of any one of items 1 to 6, wherein the ionic first polymer comprises poly(methacrylamidopropyltrimethylammonium chloride), poly(acrylamidopropyltrimethylammonium chloride), or poly(diallyldimethylammonium chloride).

Item 8 is the polymeric material of any one of items 1 to 6, wherein the ionic first polymer comprises poly(2-acrylamido-2-methylpropanesulfonic acid) or a salt thereof.

Item 9 is a method of separating, purifying, or immobilizing an ionic material. The method includes providing a semi-interpenetrating polymeric network that includes an ionic first polymer having a first ionic group and a crosslinked second polymer prepared by free radical polymerization of a second monomer composition in the presence of the ionic first polymer. The second monomer composition contains at least 30 weight percent of a crosslinking monomer based on a total weight of monomers in the second monomer composition. The method further includes contacting the semi-interpenetrating polymeric network with an ionic material having a charge that is opposite that of the first ionic group. The method still further includes adsorbing at least a portion of the ionic material on the semi-interpenetrating polymeric network.

Item 10 is the method of item 9, further comprising placing the semi-interpenetrating polymeric network in a column.

Item 11 is the method of item 9, further comprising disposing the semi-interpenetrating polymeric network on a surface of a filtration medium.

Item 12 is the method of item 9, further comprising incorporating the semi-interpenetrating polymeric network in a porous matrix.

Item 13 is the method of any one of items 9 to 12, wherein the ionic material having the charge opposite that of the first ionic group is a biomolecule.

Item 14 is a method of preparing a semi-interpenetrating polymeric network. The method includes forming an aqueous phase composition that contains an ionic first polymer, a second monomer composition, and an aqueous-based solvent composition. The ionic first polymer is soluble in the aqueous phase composition and has a first ionic group. The second monomer composition is soluble in the aqueous phase composition and contains at least 30 weight percent of a crosslinking monomer based on a total weight of monomer in the second monomer composition. The aqueous-based solvent composition contains water. The method further includes suspending the aqueous phase composition in an organic phase that includes a non-polar organic solvent and polymerizing the second monomer composition in the presence of the ionic first polymer to form particles of a semi-interpenetrating polymer network.

Item 15 is an article. The article includes a porous support and a semi-interpenetrating polymeric network particle that is incorporated into the porous support, positioned on a surface of the porous support, or a combination thereof. The semi-interpenetrating polymeric network particle includes an ionic first polymer that has a first ionic group and a crosslinked second polymer prepared by free radical polymerization of a second monomer composition in the presence of the ionic first polymer. The second monomer composition contains at least 30 weight percent of a crosslinking monomer based on a total weight of monomers in the second monomer composition.

Item 16 is the article of item 15, wherein the porous support is a membrane, filter medium, or porous matrix.

Item 17 is the article of item 15 or 16, wherein the porous support comprises a fibrillated polymer.

Item 18 is the article of any one of items 15 to 17, wherein the fibrillated polymer comprises a polyolefin or polytetrafluorethylene.

EXAMPLES

Glossary of Materials

Unless otherwise indicated, all reagents and solvents were obtained from Sigma Aldrich Company, St. Louis, Mo.

The term "MeOH" refers to methanol.

The term "EtOH" refers to ethanol.

The term "p(DADMAC)" refers to poly(diallyldimethylammonium chloride) that was obtained from Sigma-Aldrich (Milwaukee, Wis.). This polymer is available in various molecular weight ranges and concentrations. Product number 522376 is a aqueous-based mixture containing p(DADMAC) having a weight average molecular weight less than 100,000 grams/mole and having 35 weight percent solids. Product number 409014 is an aqueous-based mixture containing p(DADMAC) having a weight average molecular weight in the range of 100,000 to 200,000 grams/mole and having 20 weight percent solids. Product number 409022 is an aqueous-based mixture containing p(DACMAC) having a weight average molecular weight in the range of 200,000 to 350,000 grams/mole and having 20 weight percent solids. Product number 409030 is an aqueous-based mixture containing p(DACMAC) having a weight average molecular weight in the range of 400,000 to 500,000 grams/mole and having 20 weight percent solids.

The term "MAPTAC" refers to the monomer methacrylamidopropyltrimethyl-ammonium chloride. This monomer is commercially available from TCI America (Portland, Oreg.) as a 50 weight percent aqueous solution. Similarly, the term "p(MAPTAC)" refers to poly(methacrylamidopropyltrimethylammonium chloride).

The term "APTAC" refers to the monomer acrylamidopropyltrimethylammonium chloride. This monomer is commercially available from TCI America (Portland, Oreg.) as a 75 weight percent aqueous solution. Similarly, the term "p(APTAC)" refers to poly(acrylamidopropyltrimethylammonium chloride).

The term "AMPS" refers to the monomer 2-acylamido-2-methyl-1-propanesulfonic acid while the term "AMPS-Na" refers to the sodium salt thereof. Similarly, the terms p(AMPS) refers to poly(2-acrylamido-2-methyl-1-propanesulfonic acid) while p(AMPS-Na) refers to the sodium salt thereof. AMPS is commercially available from Lubrizol Corp. (Wickliffe, Ohio) under the trade designation AMPS 2405 as a 50 weight percent solution of the sodium salt.

The term "MBA" refers to the crosslinking monomer N,N'-methylenebisacrylamide. MBA was purchased from Research Organics (Cleveland, Ohio)

The term "Aam" refers to the monomer acrylamide.

The term "TMEDA" refers to N,N,N',N' tetramethylethylenediamine.

The term "PEG" refers to polyethylene glycol such as that commercially available from Aldrich under the trade designation poly(ethylene glycol) 2000 having a weight average molecular weight of about 2000 grams/mole.

The term "DI water" refers to deionized water.

The fibrillated polyethylene fibers used in the examples are commercially available fibers supplied as a wet lap bale identified as product code PEFYB-00E400 under the trade designation FYBREL from MiniFIBERS, Inc. (Johnson City, Tenn.). The fibers used in the examples had a moisture content of 61 weight percent.

The nylon fibers used in the examples are commercially available from MiniFIBERS, Inc. (Johnson City, Tenn.) under the catalog number Nylon NYT66-0102RR-0600.

The long strand glass fibers are commercially available from Johns Manville (Denver, Colo.) under the trade designation MICRO-STRAND 106-475.

The latex binder is an emulsion of acrylate-vinyl acetate-ethylene terpolymer in water having 55 weight percent solids and that was obtained from Air Products LP (Allentown, Pa.) under the trade designation 600 BP.

The flocculent is an aqueous solution of a copolymer of dimethylamine and epichlorohydrin that is commercially available under the trade designation MP 9307C from Mid South Chemical Co., Inc. (Ringgold, La.).

Test Methods

Static Cation Exchange Capacity for Immunoglobulin G (IgG)—Static Capacity—IgG

A slurry (50 volume percent) of polymeric beads was prepared by mixing the polymeric beads with deionized water, centrifuging at 3000 relative centrifugal force (rcf) for 20 minutes to form a packed bead bed, and then adjusting the amount of deionized water so that the total volume was twice that of the packed bead bed. The slurry was mixed well to resuspend the polymeric beads, and then a 400 microliter sample of the slurry was pipetted into a 5 mL (milliliter), 0.45 micrometer cellulose acetate centrifugal microfilter (commercially available under the trade designation CENTREX MF from VWR (Eagan, Minn.)). The water was removed by centrifugation at 3000 rcf for 5 minutes and the filtrate was discarded. The polymeric beads were then mixed with 4 mL of a buffer containing 50 mM (millimolar) sodium acetate and 80 mM sodium chloride at pH 4.5. The sample was centrifuged again at 3000 rcf for 10 minutes. The filtrate was discarded. Then a 4.5 mL sample of IgG, having a concentration of about 7 mg/mL (milligrams per milliliter) in the same acetate buffer was added to the filter containing the polymeric beads. The mixture was mixed by tumbling overnight, and then the supernate was separated from the polymeric beads after centrifugation at 3000 rcf for 20 min.

The filtrate (separated supernate) was analyzed by UV spectroscopy. The absorbance of the sample at 280 nm (nanometers) was compared to that of the starting IgG solution. The difference was used to calculate the IgG capacity of the polymeric beads. Assays were run in triplicate and averaged.

Static Anion Exchange Capacity for Bovine Serum Albumin (BSA)—Static Capacity—BSA A slurry (50 volume percent) of polymeric beads was prepared by mixing the polymeric beads with deionized water, centrifuging at 3000 relative centrifugal force (rcf) for 20 minutes to form a packed bead bed, and then adjusting the amount of deionized water so that the total volume was twice that of the packed bead bed. The slurry was mixed well to re-suspend the polymeric beads, and then a 400 microliter sample of the slurry was pipetted into a 5 mL, 0.45 micrometer cellulose acetate centrifugal microfilter (commercially available under the trade designation CENTREX MF through VWR (Eagan, Minn.)). The water was removed by centrifugation at 3000 rcf for 5 minutes. The polymeric beads were then mixed with 4 mL of a buffer containing 10 mM 3-(N-morpholino)propanesulfonic acid (MOPS) at pH 7.5. The sample was centrifuged again at 3000 rcf for 10 minutes. The filtrate was discarded. Then a 4.5 mL sample of BSA, (obtained from Sigma-Aldrich (St. Louis, Mo.)), having a concentration of about 9 mg/mL in the same MOPS buffer was added to the filter containing the polymeric beads. The mixture was mixed by tumbling overnight, and then the supernate was separated from the polymeric beads by centrifugation at 3000 rcf for 20 min.

The filtrate was analyzed by UV spectroscopy. The absorbance of the sample at 279 nm was compared to that of the starting BSA solution. The difference was used to calculate the BSA capacity of the polymeric beads. Assays were run in triplicate and averaged.

Anionic Dynamic Binding Capacity (DBC) for Bovine Serum Albumin (BSA)

Membranes were prepared that semi-interpenetrating polymeric network beads as described in Example 26. The membranes were analyzed for binding of BSA by passing a test solution through a stack (typically 3 discs having a diameter of 25 millimeters) of the membranes placed in a 25 millimeter diameter holder attached to an AKTA chromatography system (GE Healthcare). The feed solution was prepared by dissolving BSA (obtained from Sigma-Aldrich (St. Louis, Mo.) in 25 mM Tris (tris(hydroxymethyl)aminomethane buffer, pH 8.0. The concentration of BSA in the buffer was 1-1.2 mg/mL as determined by absorbance at 280 nm. The BSA feed solution was pumped through the stack of membranes at a flow rate of 1.5 mL/min until breakthrough of the BSA was observed via absorbance at 280 nm. The dynamic binding capacity of the membrane was evaluated using standard chromatography techniques and results are reported in milligrams of BSA/mL of filter media (mg/mL).

Surface Area and Porosity Measurements

Approximately 0.1 to 1.0 grams of an ion exchange resin sample was transferred to a 1.3 centimeters (0.5 inch) diameter sample tube obtained from Micromeritics, Inc. of Norcross, Ga. and degassed using a system obtained from Micromeritics, under the trade designation VACPREP 061 for 24 hours at 100° C. under vacuum (below 10 mTorr or 0.015 mbar). After degassing, the sample was allowed to cool for 10 minutes under vacuum at ambient temperature (i.e., 20° C. to 25° C.), and then loaded onto a surface area and porosity analyzer obtained from Micromeritics under the trade designation TRISTAR 3000.

A 45 point adsorption/40 point desorption isotherm was set up with relative pressures ($P/P_o$) starting at about 0.0 up to about 1.0 with a tighter distribution of points between 0.95 and 1.0 (See Table for Target Pressures and Points). No first "pressure fixed dose" was set. The maximum volume increment was set at 10.00 cubic centimeter per gram at standard temperature and pressure (STP), the "absolute pressure tolerance" was set at 5 millimeters (mm) Hg, and the "relative pressure tolerance" was set at 2.0 percent. "Fast evacuation" and "leak test" options were not used. With the dewar of liquid nitrogen lowered (i.e., the sample was not in the liquid nitrogen), an evacuation time of 0.5 hours was implemented during the free space measurement. The dewar was raised for analysis (i.e., the tube containing the sample was placed in liquid nitrogen). At 77.350 K (the temperature of liquid nitrogen), $P_o$ was measured at 120 min intervals during the analysis. The gas adsorptive properties using a standard Pstat versus temperature table for nitrogen gas were set at the following values: non-ideality factor, 0.0000620; density conversion factor, 0.0015468; molecular cross-sectional area, 0.162 nm². BJH adsorption/desorption cumulative pore volumes and cumulative surface areas were calculated for pores between 17 Å to 2,000 Å diameter (corresponding to pores between 2 and 200 nanometers), and based on quantity of $N_2$ adsorbed at each relative pressure during the 45 adsorption points and 40 desorption points.

Table 1 shows the adsorption and desorption points used for the analysis. The cumulative surface area and cumulative pore volume during adsorption are reported. Point 45 with a Relative Pressure of $P/P_o=1.000$ is considered to be neither an adsorption nor desorption point.

TABLE 1

Target Relative Pressures for Pore Size Distribution Measurements

| Point | Relative Pressure ($P/P_o$) |
|---|---|
| BJH Adsorption | |
| 1 | 0.060 |
| 2 | 0.080 |
| 3 | 0.120 |
| 4 | 0.140 |
| 5 | 0.160 |
| 6 | 0.200 |
| 7 | 0.250 |
| 8 | 0.300 |
| 9 | 0.350 |
| 10 | 0.400 |
| 11 | 0.450 |
| 12 | 0.500 |
| 13 | 0.550 |
| 14 | 0.600 |
| 15 | 0.650 |
| 16 | 0.700 |
| 17 | 0.740 |
| 18 | 0.770 |
| 19 | 0.800 |
| 20 | 0.820 |
| 21 | 0.840 |
| 22 | 0.860 |
| 23 | 0.875 |
| 24 | 0.890 |
| 25 | 0.905 |
| 26 | 0.915 |
| 27 | 0.925 |
| 28 | 0.933 |
| 29 | 0.940 |
| 30 | 0.947 |
| 31 | 0.953 |
| 32 | 0.959 |
| 33 | 0.964 |
| 34 | 0.968 |
| 35 | 0.971 |
| 36 | 0.974 |
| 37 | 0.977 |
| 38 | 0.980 |
| 39 | 0.982 |
| 40 | 0.984 |
| 41 | 0.986 |
| 42 | 0.988 |
| 43 | 0.989 |
| 44 | 0.990 |
| 45 | 1.000 |
| BJH Desorption | |
| 46 | 0.990 |
| 47 | 0.989 |
| 48 | 0.988 |
| 49 | 0.986 |
| 50 | 0.984 |
| 51 | 0.982 |
| 52 | 0.980 |
| 53 | 0.977 |
| 54 | 0.974 |
| 55 | 0.971 |
| 56 | 0.968 |
| 57 | 0.964 |
| 58 | 0.959 |
| 59 | 0.953 |
| 60 | 0.947 |
| 61 | 0.940 |
| 62 | 0.933 |
| 63 | 0.925 |
| 64 | 0.915 |
| 65 | 0.905 |
| 66 | 0.890 |
| 67 | 0.875 |
| 68 | 0.860 |
| 69 | 0.840 |
| 70 | 0.820 |
| 71 | 0.800 |
| 72 | 0.770 |
| 73 | 0.740 |
| 74 | 0.700 |
| 75 | 0.650 |
| 76 | 0.600 |
| 77 | 0.550 |
| 78 | 0.500 |
| 79 | 0.450 |
| 80 | 0.400 |
| 81 | 0.350 |
| 82 | 0.300 |
| 83 | 0.250 |
| 84 | 0.200 |
| 85 | 0.140 |

Preparatory Example 1

Preparation of the Ionic Polymer p(MAPTAC)

MAPTAC (160 grams of a 50 weight percent aqueous solution), sodium persulfate (0.4 grams), and ethanol (40 grams) were added to a 1 quart bottle and then purged with nitrogen for 10 minutes. The bottle was sealed and placed in a rotating water bath (commercially available from SDL Atlas, Inc. (Rock Hill, S.C.) under the trade designation LAUNDER-O-METER) at 55° C. for 23 hours. The temperature was then raised to 60° C. for another 6 hours. After removing the bottle from rotating water bath, deionized (DI) water (80 grams) and ethanol (40 grams) were added to it. The bottle was then sealed and replaced in the rotating water bath for an additional 2 hours. The finished polymer was used to prepare particles of the invention without further purification or dilution.

Preparatory Example 2

Preparation of the Ionic Polymer p(APTAC)

The polymer was prepared according to the procedure used for Preparatory Example 1 except that the following reagents were used: APTAC (106.6 grams of a 75 weight percent aqueous solution), sodium persulfate (0.4 grams), ethanol (40 grams) and DI water (53.4 grams).

Preparatory Example 3

Preparation of the Ionic Polymer p(AMPS-Na)

The ionic polymer p(AMPS-Na) was prepared using a procedure similar to that used for Preparatory Example 1. The following reagents were used instead: AMPS-Na (200 grams of a 50 weight percent aqueous solution), sodium persulfate (1 gram), and DI water (200 grams). The reagents were placed in a 1 quart bottle, purged with nitrogen for 10 minutes, and the sealed bottle was placed in the rotating water bath at 60° C. for a total of 21 hours. The finished polymer was used to prepare particles of the invention without further purification or dilution.

Example 1

Preparation of Semi-Interpenetrating Polymer Networks

Semi-interpenetrating polymer networks in the form of beads were prepared by inverse suspension polymerization. A polymeric stabilizer (0.23 grams of a copolymer of isooctylacrylate (91.8 weight percent) and 2-acrylamidoisobutyramide (8.2 weight percent)) and heptane (348 mL) were added to a flask equipped with a mechanical stirrer (stirring rate 500 rpm), nitrogen inlet, thermometer, heating mantel with temperature controller, and condenser. This organic phase solution was heated to 35° C. with stirring, and sparged with nitrogen gas for 30 minutes.

An aqueous-phase mixture was prepared that contained MBA (16.0 grams), MeOH, (67.5 mL), and deionized water (19 mL). A polymer, p(DADMAC) having a weight average molecular weight of less than about 100,000 (35 grams of an aqueous-based mixture with 20 weight percent solids) was added, and the mixture was stirred magnetically and warmed on a hot plate (30 to 35° C.) to produce a homogeneous solution. Sodium persulfate (0.55 grams) was dissolved in deionized water (3 mL), and this solution was mixed into the monomer solution.

The aqueous-phase mixture was then added to the flask containing the organic solution. The resulting reaction mixture was stirred and purged with nitrogen for 10 minutes. TMEDA (0.55 mL) was added to initiate the polymerization. The reaction temperature rose to about 40° C. over 15 minutes as the formation of polymer particles became evident. The reaction mixture was allowed to stir for a total of 2 hours after the addition of the TMEDA. At the end of the reaction period, the product was filtered using a sintered glass funnel and then washed with acetone (2×250 mL), methanol (2×250 mL), acetone (2×250 mL). The washed product was wet classified using water as the flowing liquid on a Ro-Tap Model RX-29 classifier (W. S. Tyler, Mentor, Ohio) to yield colorless particles (substantially beadlike) in the size range from about 38-106 microns. Anion exchange capacity for bovine serum albumin (Static BSA Capacity) was determined as shown in Table 3.

Examples 2-22

Preparation of Semi-Interpenetrating Polymer Networks

Examples 2-22 were prepared according to the procedure of Example 1 using the aqueous-phase compositions summarized in Table 2. All samples except Examples 12 and 13 had an organic phase identical to that used for Example 1. For Examples 12 and 13, the organic phase contained heptane (348 mL) and toluene (188 mL).

TABLE 2

| | | | Aqueous-phase composition for Examples 1-22 | | | |
|---|---|---|---|---|---|---|
| Example | MBA, grams | Comonomer, grams | Ionic polymer, grams | Water, grams | Alcohol, grams | Porogen, grams |
| 1 | MBA, 16 | None, 0 | p(DADMAC) (MW < 100,000), 7 | 50 | MeOH, 67.5 | None, 0 |
| 2 | MBA, 16 | None, 0 | p(DADMAC) (MW < 100,000), 10 | 50 | MeOH, 67.5 | None, 0 |
| 3 | MBA, 16 | None, 0 | p(DADMAC) (MW < 100,000), 7 | 50 | MeOH, 62.5 | PEG, 5 |
| 4 | MBA, 16 | None, 0 | p(DADMAC) (MW < 100,000), 10 | 50 | MeOH, 62.5 | PEG, 5 |
| 5 | MBA, 10 | None, 0 | p(DADMAC) (MW < 100,000), 4 | 50 | MeOH, 67.5 | None, 0 |

TABLE 2-continued

Aqueous-phase composition for Examples 1-22

| Example | MBA, grams | Comonomer, grams | Ionic polymer, grams | Water, grams | Alcohol, grams | Porogen, grams |
|---|---|---|---|---|---|---|
| 6 | MBA, 10 | None, 0 | p(DADMAC) (MW < 100,000), 4 | 50 | MeOH, 62.5 | PEG, 5 |
| 7 | MBA, 16 | None, 0 | p(DADMAC) (MW < 100,000), 10 | 50 | MeOH, 67.5 | None, 0 |
| 8 | MBA, 16 | None, 0 | p(DADMAC) (MW 100,000-200,000), 10 | 50 | MeOH, 67.5 | None, 0 |
| 9 | MBA, 16 | None, 0 | p(DADMAC) (MW 200,000-350,000), 10 | 50 | MeOH, 67.5 | None, 0 |
| 10 | MBA, 16 | None, 0 | p(DADMAC) (MW 400,000-500,000), 10 | 50 | MeOH, 67.5 | None, 0 |
| 11 | MBA, 16 | None, 0 | p(DADMAC) (MW 400,000-500,000), 10 | 75 | MeOH, 85 | None, 0 |
| 12 | MBA, 12 | None, | p(MAPTAC), 7 | 75 | EtOH, 85 | None, 0 |
| 13 | MBA, 12 | None, 0 | p(APTAC), 7 | 75 | EtOH. 85 | None, 0 |
| 14 | MBA, 12 | None, 0 | p(AMPS-Na), 7 | 75 | MeOH, 75 | None, 0 |
| 15 | MBA, 12 | None, 0 | p(AMPS-Na), 10 | 75 | MeOH, 75 | None, 0 |
| 16 | MBA, 16 | AMPS-Na, 2 | p(DADMAC) (MW 400,000-500,000), 10 | 75 | MeOH, 67.5 | None, 0 |
| 17 | MBA, 16 | Aam, 4 | p(DADMAC) (MW < 100,000), 7 | 50 | MeOH, 67.5 | None, 0 |
| 18 | MBA, 16 | Aam, 4 | p(DADMAC) (MW < 100,000), 10 | 50 | MeOH, 62.5 | PEG, 5 |
| 19 | MBA, 16 | AMPS-Na, 0.5 | p(DADMAC) (MW < 100,000), 7 | 50 | MeOH, 67.5 | None, 0 |
| 20 | MBA, 16 | AMPS-Na, 0.5 | p(DADMAC) (MW < 100,000), 7 | 50 | MeOH, 62.5 | PEG, 5 |
| 21 | MBA, 16 | AMPS-Na, 5 | p(DADMAC) (MW 400,000-500,000), 10 | 75 | MeOH, 67.5 | None, 0 |
| 22 | MBA, 16 | AMPS-Na, 10 | p(DADMAC) (MW 400,000-500,000), 10 | 75 | MeOH, 67.5 | None, 0 |

Examples 1 to 22 were tested for static capacity. Examples 1-13 and 16-22 were tested for Static BSA Capacity while Examples 14 and 15 were tested for Static IgG Capacity.

TABLE 3

Static Capacity of Example 1-22

| Examples | Static Capacity, mg/mL |
|---|---|
| 1 | 49 (BSA) |
| 2 | 97 (BSA) |
| 3 | 111 (BSA) |
| 4 | 100 (BSA) |
| 5 | 56 (BSA) |
| 6 | 73 (BSA) |
| 7 | 54 (BSA) |
| 8 | 94 (BSA) |
| 9 | 152 (BSA) |
| 10 | 169 (BSA) |
| 11 | 169 (BSA) |
| 12 | 138 (BSA) |
| 13 | 62 (BSA) |
| 14 | 79 (IgG) |
| 15 | 101 (IgG) |
| 16 | 246 (BSA) |
| 17 | 69 (BSA) |
| 18 | 114 (BSA) |
| 19 | 94 (BSA) |
| 20 | 77 (BSA) |
| 21 | 217 (BSA) |
| 22 | 112 (BSA) |

Examples 1 to 6 were evaluated for porosity according to the procedure described above. Results are shown in Table 4.

TABLE 3

Surface area and pore volume of Examples 1-6

| Example | BJH Cumulative Surface Area (m²/g) | BJH Cumulative Pore Volume (cc/g) |
|---|---|---|
| 1 | 61 | 0.29 |
| 2 | 56 | 0.26 |
| 3 | 91 | 0.39 |
| 4 | 134 | 0.42 |

TABLE 3-continued

Surface area and pore volume of Examples 1-6

| Example | BJH Cumulative Surface Area (m²/g) | BJH Cumulative Pore Volume (cc/g) |
|---|---|---|
| 5 | 208 | 0.61 |
| 6 | 272 | 0.74 |

Example 23

Preparation of Article Containing Semi-Interpenetrating Polymer Network Beads

Particles prepared in Example 10 were incorporated into wet-laid nonwoven webs.

A master batch of premix was prepared by blending 48.07 grams of fibrillated polyethylene fibers, 24.0 grams of nylon fibers, and 6.0 grams of glass fibers with enough water to make 4 liters in a WARING blender (Model 37BL84) at medium speed for about 60 seconds. One-fourth of the batch (containing 12.02 grams of polyethylene fibers, 1.5 grams nylon fibers, and 1.5 grams of glass fibers) was placed in a beaker and stirred with an electric motor mixer at medium-high for about 5 minutes. Latex binder (1.4 grams) was added and the mixture was stirred for about another two minutes. Then flocculant (2.81 grams) was added and mixed. Finally, 25 mL of the beads in water from Example 10 (about 10 grams of dry beads) were added and stirred with an electric motor mixer for about 2 minutes.

The resulting slurry mixture was poured into an 8-inch (20.3 cm) square sheet forming apparatus obtained from Williams Apparatus Co. (Watertown, N.Y.) that had been filled to about 1 centimeters above the screen with tap water. The valve was opened immediately to create a vacuum for removing the water and forming a wet-laid sheet.

The wet-laid sheet was transferred onto a sheet of blotter paper and pressed between three layers of blotter paper and two reinforced screens in an air powered press set at 60 pounds per square inch for about 2 minutes until no more water was expelled. The press was obtained from Mead Fluid Dynamics, Chicago, Ill.). The wet-laid sheet was then placed on a clean sheet of blotter paper and dried in an oven set at 150° C. for about 30 minutes. The dried sheet (approximately 8 inches square or 20.3 cm square) weighed 18.97 grams. A disc measuring 47 mm in diameter was die cut from the sheet. The disc weighed 1.00 gram before further drying on a moisture balance. The disc had a moisture content of 3.47 wt %. The moisture content was measured according to the manufacturer's instructions using a moisture balance scale (Moisture Analyzer Model MJ33 obtained from Mettler-Toledo, Inc. (Columbus, Ohio)) having a heated chamber. The disc was placed in the heated chamber of the balance with the temperature set at 90° C. and dried. The disc was heated until the change in weight was less than 2 milligrams in 30 seconds and the final weight was recorded. The moisture content of the disc was determined as a percentage of weight loss from the unheated sample to the dried sample.

The flow resistance time was determined using a 47 mm filter magnetic filter holder obtained from Pall Corporation (Port Washington, N.Y.). The disc was inserted into the funnel of the filter holder and the filter holder was connected to a vacuum pump. Room temperature tap water (100 mL) was poured into the funnel and a vacuum of 20 inches of mercury was applied to the filter holder. The flow resistance was the time in seconds (timed with a stopwatch) required for complete draining of the water determined by visual observation. The flow resistance for this example was 11 seconds.

Example 24

Preparation of Article Containing Semi-Interpenetrating Polymer Network Beads

A wet-laid sheet was prepared and tested according to the procedures of Example 23 except that 1.5 grams of latex binder, 3.19 grams of flocculant, and 37.5 mL of beads from Example 10 were used. There were 15 grams of dry beads in the sheet. The sheet was dried for about 32 minutes. The resulting sheet had a weight of 26.78 grams. A disc having a diameter of 47 mm weighed 1.31 grams with 3.9 weight percent moisture. The flow resistance was 22.5 seconds for 100 mL of water under 20 inches of mercury vacuum.

Example 25

Preparation of Semi-Interpenetrating Polymer Network

A reaction vessel that was fitted with a mechanical stirrer, condenser, and dropping funnel was charged with N,N-dimethylaminoethylmethacrylate (100 grams). A solution of chloroacetone guanylhydrazone hydrochloride (117.1 grams) in methanol (285 grams) was added at such a rate that the reaction exotherm did not exceed 50° C. After completion of the addition, the reaction solution was stirred for two hours. The solvent was removed by rotary evaporation under vacuum at about 40° C. to produce a colorless solid. $^1$H-NMR spectroscopy confirmed the formation of the expected quaternized monomeric reaction product. The above monomer (50 grams) was placed in a reaction vessel with water (50 grams) and 2,2'-azobis(2-amidinopropane) dihydrochloride (0.23 grams) that was obtained from Wako Chemical Co. (Richmond, Va.). The solution was purged with nitrogen for 20 minutes and then heated at 50° C. for 2 hours. $^1$H-NMR spectroscopy confirmed the formation of the expected polymer.

Particles of a semi-interpenetrating polymer network were prepared by the procedure similar to that described in Example 1 except that the p(DADMAC) was replaced with the ionic polymer prepared above (5 grams). The aqueous-based solvent was methanol (85 mL) and water (75 mL). The organic phase solvent was heptane (348 mL) and toluene (188 mL). Static BSA Capacity of these particles was measured to be 45 mg/mL.

Examples 26

Preparation of Article Containing Semi-Interpenetrating Polymer Network Beads

The general procedure for preparing the membrane is described in Example 1 of European Patent Publication No. 0498557 (Markell et al.). Semi-interpenetrating polymer beads were prepared according to Example 16, and were classified to provide a sample of 160 microns average particle size. Measured BSA static capacity of this sample was 181 mg/ml.

A composition was prepared by mixing together 101 grams of these beads with 90 grams of isopropyl alcohol by hand. Then 83 grams of a polytetrafluoroethylene emulsion (obtained under the product name FLUON AD705 from AGC Chemicals Americas, LTD. (Exton, Pa.)) was added followed by the addition of 4 grams of water. The mixture was mixed by hand with a spatula for about 2 minutes until it formed a doughy mass. The mass was fed through a pair of nip rollers having a gap setting of 150 mils, a temperature set at 100° F., and a speed of 15 feet per minute to form a flattened strip in the first pass. The flattened strip was folded lengthwise into thirds to form 3 thicknesses. The folded strip was fed through the nip rollers a second time at a 45 degree rotation from the original orientation of the sheet in the first pass. The process was repeated again for a total of 10 passes through the nip at the same settings. In each pass the folded strip was fed through at a 45 degree rotation from the orientation of the trip in the previous pass.

The gap opening between the rollers was then decreased to 100 mils. The flattened strip was folded in half on itself three times to form a thick sheet having eight layers. The sheet was passed through the nip at a temperature set at 100° F. and a speed of 15 feet per minute. In successive passes through the nip, the gap opening was reduced to 70 mils, then to 50 mils, and then 35 mils. At this point, the sheet was again folded into eight layers fed thought the gap which was opened to 100 mils. The sheet was then fed into the nip at successively decreased gap openings of 70 mils, 50 mils, 35 mils, 25 mils, and finally through a gap setting of 20 mils to form a membrane measuring about 6 inches by about 24 inches. The membrane was slightly damp and was tested without further processing for the Dynamic Binding Capacity for BSA. The average result of 2 tests run at different times was 94 mg/mL.

What is claimed is:

1. A polymeric material comprising a semi-interpenetrating polymeric network comprising:
   an ionic first polymer having a first ionic group, wherein the ionic first polymer is a polymerized product of a first monomer composition comprising at least 50 weight percent of a first ionic monomer based on a total weight of monomers in the first monomer composition; and
   a crosslinked second polymer prepared by free radical polymerization of a second monomer composition in the presence of the ionic first polymer, the second monomer composition comprising at least 30 weight percent of a crosslinking monomer based on a total weight of monomer in the second monomer composition,
wherein the semi-interpenetrating polymeric network is macroporous.

2. The polymeric material of claim 1, wherein the polymeric material comprises at least 10 weight percent of the ionic first polymer.

3. The polymeric material of claim 1, wherein the crosslinked second polymer has a second ionic group with a charge that is opposite that of the first ionic group.

4. The polymeric material of claim 1, wherein the crosslinked second polymer is non-ionic.

5. The polymeric material of claim 1, wherein the semi-interpenetrating polymeric network is in the form of a bead.

6. The polymeric material of claim 1, wherein the ionic first polymer comprises poly(methacrylamidopropyltrimethylammonium chloride), poly(acrylamidopropyltrimethylammonium chloride), or poly(diallyldimethylammonium chloride).

7. The polymeric material of claim 1, wherein the ionic first polymer comprises poly(2-acrylamido-2-methylpropanesulfonic acid) or a salt thereof.

8. A method of separating, purifying, or immobilizing an ionic material, the method comprising:
   providing a semi-interpenetrating polymeric network that is macroporous, the semi-interpenetrating polymeric network comprising
      an ionic first polymer having a first ionic group, wherein the ionic first polymer is a polymerized product of a first monomer composition comprising at least 50 weight percent of a first ionic monomer based on a total weight of monomers in the first monomer composition; and
      a crosslinked second polymer prepared by free radical polymerization of a second monomer composition comprising at least 30 weight percent of a crosslinking monomer based on a total weight of monomer in the second monomer composition;
   contacting the semi-interpenetrating polymer network with an ionic material having a charge that is opposite that of the first ionic group; and
   adsorbing at least a portion of the ionic material on the semi-interpenetrating polymeric material.

9. The method of claim 8, further comprising placing the semi-interpenetrating polymeric network in a column.

10. The method of claim 8, further comprising disposing the semi-interpenetrating polymeric network on a surface of a filtration medium.

11. The method of claim 8, further comprising incorporating the semi-interpenetrating polymeric network in a porous matrix.

12. The method of claim 8, wherein the ionic material having the charge opposite that of the first ionic group is a biomolecule.

13. A method of preparing a semi-interpenetrating polymeric network, the method comprising:
   forming an aqueous phase composition comprising
      an ionic first polymer soluble in the aqueous phase composition, the ionic first polymer having a first ionic group, wherein the ionic first polymer is a polymerized product of a first monomer composition comprising at least 50 weight percent of a first ionic monomer based on a total weight of monomers in the first monomer composition;
      a second monomer composition soluble in the aqueous phase composition and comprising at least 30 weight percent of a crosslinking monomer based on a total weight of monomer in the second monomer composition; and
      an aqueous-based solvent composition;
   suspending the aqueous phase composition in an organic phase comprising a non-polar organic solvent; and
   polymerizing the second monomer composition in the presence of the ionic first polymer to form particles of a semi-interpenetrating polymer network, wherein the semi-interpenetrating polymeric network is macroporous.

14. An article comprising:
a porous support; and
semi-interpenetrating polymeric network particles incorporated into the porous support, on a surface of the porous support, or a combination thereof, the semi-interpenetrating polymeric network particles comprising
   an ionic first polymer having a first ionic group, wherein the ionic first polymer is a polymerized product of a first monomer composition comprising at least 50 weight percent of a first ionic monomer based on a total weight of monomers in the first monomer composition; and
   a crosslinked second polymer prepared by free radical polymerization of a second monomer composition in the presence of the ionic first polymer, the second monomer composition comprising at least 30 weight percent of a crosslinking monomer based on a total weight of monomer in the second monomer composition, wherein the semi-interpenetrating polymeric network particles are macroporous.

15. The article of claim 14, wherein the porous support is a membrane, filter medium, or porous matrix.

16. The article of claim 14, wherein the porous support comprises a fibrillated polymer.

17. The article of claim 16, wherein the fibrillated polymer comprises a polyolefin or polytetrafluorethylene.

* * * * *

UNITED STATES PATENT AND TRADEMARK OFFICE
CERTIFICATE OF CORRECTION

| | | |
|---|---|---|
| PATENT NO. | : 9,056,316 B2 | Page 1 of 2 |
| APPLICATION NO. | : 13/703267 | |
| DATED | : June 16, 2015 | |
| INVENTOR(S) | : Del Lawson | |

It is certified that error appears in the above-identified patent and that said Letters Patent is hereby corrected as shown below:

In the Specification

Column 3
Line 67, delete "thereof" and insert -- thereof. --, therefor.

Column 4
Line 45, delete "thereof" and insert -- thereof. --, therefor.

Column 6
Line 63, delete "acetoxyalky(meth)acrylates" and insert -- acetoxyalkyl(meth)acrylates --, therefor.

Column 13
Line 49, delete "mannoic" and insert -- mannonic --, therefor.

Column 14
Line 48, delete "of the of the" and insert -- of the --, therefor.

Column 15
Line 38 (Approx.), delete "(MBTE);" and insert -- (MTBE); --, therefor.

Column 17
Line 47, delete "semi-interpentrating" and insert -- semi-interpenetrating --, therefor.

Column 24
Lines 48-49, delete "polytetrafluorethylene." and insert -- polytetrafluoroethylene. --, therefor.

Column 25
Line 3, delete "p(DACMAC)" and insert -- p(DADMAC) --, therefor.
Line 7, delete "p(DACMAC)" and insert -- p(DADMAC) --, therefor.

Signed and Sealed this
Twelfth Day of April, 2016

Michelle K. Lee
*Director of the United States Patent and Trademark Office*

CERTIFICATE OF CORRECTION (continued)
U.S. Pat. No. 9,056,316 B2

Line 32, delete "Ohio)" and insert -- Ohio). --, therefor.

In the Claims

Column 37
Line 11, in Claim 17, delete "polytetrafluorethylene." and insert -- polytetrafluoroethylene. --, therefor.